(12) United States Patent
Whear et al.

(10) Patent No.: US 11,742,550 B2
(45) Date of Patent: Aug. 29, 2023

(54) LEAD ACID BATTERY SEPARATORS, BATTERIES, AND RELATED METHODS

(71) Applicant: Daramic, LLC, Charlotte, NC (US)

(72) Inventors: J. Kevin Whear, Utica, KY (US); Eric H. Miller, Philpot, KY (US); Naoto Miyake, Newburgh, IN (US); Joerg Deiters, Ettenheim (DE)

(73) Assignee: Daramic, LLC, Charlotte, NC (US)

( * ) Notice: Subject to any disclaimer, the term of this patent is extended or adjusted under 35 U.S.C. 154(b) by 232 days.

(21) Appl. No.: 16/012,920

(22) Filed: Jun. 20, 2018

(65) Prior Publication Data

US 2018/0366710 A1 Dec. 20, 2018

(30) Foreign Application Priority Data

Jun. 20, 2017 (FR) .................................... 1755607
Jun. 20, 2017 (FR) .................................... 1755622

(51) Int. Cl.
| | |
|---|---|
| *H01M 50/463* | (2021.01) |
| *H01M 50/446* | (2021.01) |
| *H01M 50/454* | (2021.01) |
| *H01M 50/451* | (2021.01) |
| *H01M 10/06* | (2006.01) |

(52) U.S. Cl.
CPC ....... *H01M 50/463* (2021.01); *H01M 50/446* (2021.01); *H01M 50/451* (2021.01); *H01M 50/454* (2021.01); *H01M 10/06* (2013.01)

(58) Field of Classification Search
CPC ...... H01M 2/18; H01M 2/1686; H01M 2/166; H01M 10/06; H01M 50/463; H01M 50/446; H01M 50/449; H01M 10/12; H01M 2220/10; H01M 2220/20; H01M 2220/30; H01M 50/451; H01M 50/454; Y02P 70/50; Y02E 60/10
See application file for complete search history.

(56) References Cited

U.S. PATENT DOCUMENTS

| | | | | | |
|---|---|---|---|---|---|
| 5,679,479 | A | * | 10/1997 | Young ................. | H01M 50/463 |
| | | | | | 429/147 |
| 6,132,899 | A | * | 10/2000 | Young ................. | H01M 2/145 |
| | | | | | 429/147 |
| 2005/0130309 | A1 | * | 6/2005 | Gjerde ................. | G01N 33/00 |
| | | | | | 436/34 |

(Continued)

FOREIGN PATENT DOCUMENTS

| WO | WO2015/148305 | * 10/2015 | ............ H01M 2/14 |
|---|---|---|---|
| WO | WO2018/175699 | 9/2018 | |

OTHER PUBLICATIONS

Besenhard, J.O., Editor, Handbook of Battery Materials, Chapter 9, Wiley-VCH Verlag GmbH (Weinheim, Germany), (p. 245-292), (1999).

(Continued)

*Primary Examiner* — Kiran Quraishi Akhtar
(74) *Attorney, Agent, or Firm* — Hammer & Associates, P.C.

(57) ABSTRACT

Disclosed herein are improved separators for lead acid batteries. The separators may include a porous membrane, a rubber, and at least one performance enhancing additive, positive and/or negative ribs, and/or lowered acid leachable total organic carbon.

35 Claims, 8 Drawing Sheets

(56) References Cited

U.S. PATENT DOCUMENTS

| | | | |
|---|---|---|---|
| 2011/0045339 A1* | 2/2011 | La | H01M 50/411 |
| | | | 429/163 |
| 2011/0091761 A1* | 4/2011 | Miller | H01M 2/162 |
| | | | 429/143 |
| 2012/0070747 A1* | 3/2012 | Whear | H01M 2/18 |
| | | | 429/247 |
| 2012/0094183 A1 | 4/2012 | Deiters et al. | |
| 2016/0104876 A1* | 4/2016 | Avison | B29C 41/003 |
| | | | 429/188 |
| 2016/0329540 A1* | 11/2016 | Miller | H01M 50/44 |
| 2017/0054123 A1* | 2/2017 | Miller | H01M 50/411 |
| 2017/0104199 A1 | 4/2017 | Miller et al. | |
| 2017/0179454 A1* | 6/2017 | Natesh | H01M 50/463 |
| 2017/0294636 A1* | 10/2017 | Naiha | H01M 10/06 |

OTHER PUBLICATIONS

EP Extended Search Report; from EP counterpart Application No. 18819625.7.

* cited by examiner

LEAD ACID BATTERY SEPARATORS, BATTERIES, AND RELATED METHODS

FIELD

In accordance with at least select embodiments, the present disclosure or invention is directed to novel or improved separators for lead acid batteries, such as flooded lead acid batteries, and in particular enhanced flooded lead acid batteries ("EFBs"), and various other lead acid batteries, such as gel and absorptive glass mat ("AGM") batteries. In accordance with at least select embodiments, the present disclosure or invention is directed to novel or improved separators, battery separators, EFB separators, batteries, cells, systems, methods involving the same, vehicles using the same, methods of manufacturing the same, the use of the same, and any combination thereof. In addition, disclosed herein are methods, systems, and battery separators for: enhancing battery life; reducing battery failure; reducing water loss; improving oxidation stability; improving, maintaining and/or lowering float current; improving end of charge ("EOC") current; decreasing the current and/or voltage needed to charge and/or fully charge a deep cycle battery; minimizing internal electrical resistance; lowering electrical resistance; increasing wettability; lowering wet out time with electrolyte; reducing time of battery formation; reducing antimony poisoning; reducing acid stratification; improving acid diffusion and/or improving uniformity in lead acid batteries; and any combination thereof. In accordance with at least particular embodiments, the present disclosure or invention is directed to an improved separator for lead acid batteries wherein the separator includes rubber, latex, and/or improved performance enhancing additives and/or coatings. In accordance with at least certain embodiments, the disclosed separators are useful for deep-cycling applications, such as in motive machines such as golf carts (sometimes referred to as golf cars); inverters; and renewable energy systems and/or alternative energy systems, such as solar power systems and wind power systems. The disclosed separators are also useful in battery systems wherein deep cycling and/or partial state of charge operations are part of the battery applications. In certain other embodiments, the disclosed separator may be used in battery systems where additives and/or alloys (antimony being a key example) are added to the battery to enhance the life and/or performance of the battery and/or to enhance the deep cycling and/or partial state of charge operating capability of the battery.

BACKGROUND

A battery separator is used to separate the battery's positive and negative electrodes or plates in order to prevent an electrical short. Such a battery separator is typically porous so that ions may pass therethrough between the positive and negative electrodes or plates. In lead acid storage batteries, such as automotive batteries and/or industrial batteries and/or deep cycle batteries, the battery separator is typically a porous polyethylene separator; in some cases, such a separator may include a backweb and a plurality of ribs standing on one or both sides of the backweb. See: Besenhard, J. O., Editor, Handbook of Battery Materials, Wiley-VCH Verlag GmbH, Weinheim, Germany (1999), Chapter 9, pp. 245-292. Some separators for automotive batteries are made in continuous lengths and rolled, subsequently folded, and sealed along the edges to form pouches or envelopes that receive the electrodes for the batteries. Certain separators for industrial (or traction or deep cycle storage) batteries are cut to a size about the same as an electrode plate (pieces or leaves).

The electrodes in a lead acid battery are often made up of a lead alloy having a relatively high antimony content. Batteries operating at a partial state of charge ("PSOC") tend to lend themselves to acid stratification. In this condition, more acid is concentrated within the electrolyte at the bottom of the battery, and more water is concentrated in the electrolyte at the top of the battery. Lead becomes soluble in water and goes into solution. However, the lead precipitates in acid and forms a solid crystal. Therefore, acid stratification tends to lead to lead sulfate ($Pb_2SO_4$) crystal formation that form dendrites. Even without acid stratification, acid may be depleted during discharge and allow lead to go into solution, and then precipitate into crystals as acid is restored during a charge cycle.

When these crystals build up to a large enough size, the dendrites can tear or burn a hole through the separator and form a bridge to connect the negative electrode to the positive electrode, thus leading to a short. This can hamper voltage discharge, charge acceptance, or even lead to a catastrophic failure and render the battery non-functional. All of which compromise the performance and life of the battery.

For at least certain applications or batteries, there remains a need for improved separators providing for improved cycle life, reduced acid stratification, and/or reduced dendrite formation. More particularly, there remains a need for improved separators, and improved batteries (such as those operating at a partial state of charge) comprising an improved separator, which provides for enhancing battery life, reducing battery failure, improving oxidation stability, improving, maintaining, and/or lowering float current, improving end of charge ("EOC") current, decreasing the current and/or voltage needed to charge and/or fully charge a deep cycle battery, minimizing internal electrical resistance increases, lowering electrical resistance, reducing antimony poisoning, reducing acid stratification, improving acid diffusion, and/or improving uniformity in lead acid batteries.

SUMMARY

The details of one or more embodiments are set forth in the descriptions below. Other features, objects, and advantages will be apparent from the description and from the claims. In accordance with at least select embodiments, the present disclosure or invention may address the above issues or needs. In accordance with at least certain objects, aspects, or embodiments, the present disclosure or invention may provide an improved separator and/or battery which overcomes the aforementioned problems, for instance by providing batteries having reduced acid stratification, mitigating the formation of dendrites, and/or having improved cycling performance.

In accordance with at least select embodiments, the present disclosure or invention is directed to novel or improved separators, cells, batteries, systems, and/or methods of manufacture and/or use of such novel separators, cells, and/or batteries. In accordance with at least certain embodiments, the present disclosure or invention is directed to novel or improved battery separators for flat-plate batteries, tubular batteries, flooded lead acid batteries, enhanced flooded lead acid batteries ("EFBs"), deep-cycle batteries, gel batteries, absorptive glass mat ("AGM") batteries, inverter batteries, solar or wind power storage batteries, vehicle batteries, starting-lighting-ignition ("SLI") vehicle batteries, idling-start-stop ("ISS") vehicle batteries, automobile batteries, truck batteries, motorcycle batteries, all-terrain vehicle batteries, forklift batteries, golf cart batteries, hybrid-electric vehicle batteries, electric vehicle batteries, e-rickshaw batteries, e-bike batteries, and/or improved methods of making and/or using such improved separators, cells, batteries, systems, and/or the like. In addition, disclosed herein are methods, systems and battery separators for enhancing battery performance and life, reducing battery failure, reducing acid stratification, mitigating dendrite formation, improving oxidation stability, improving, maintaining, and/or lowering float current, improving end of charge current, decreasing the current and/or voltage needed to charge and/or fully charge a deep cycle battery, reducing internal electrical resistance, reducing antimony poisoning, increasing wettability, improving acid diffusion, improving uniformity in a lead acid battery, and/or improving cycle performance. In accordance with at least particular embodiments, the present disclosure or invention is directed to an improved separator wherein the novel separator includes decreased electrical resistance, performance enhancing additives or coatings, improved fillers, increased wettability, increased acid diffusion, negative cross ribs, and/or the like. In accordance with at least one very particular embodiment, the present disclosure or invention is directed to an improved separator wherein the novel separator includes or has an acid leachable total organic carbon ("TOC") of less than or equal to approximately 2,000 mg per kg of the battery separator as measured by a potassium persulfate solution react with carbon in an ultra-violet detection chamber, and more preferably less than or equal to approximately 1,500 mg per kg of the battery separator as measured by a potassium persulfate solution react with carbon in an ultra-violet detection chamber, and even more preferably less than or equal to approximately 1,000 mg per kg of the battery separator as measured by a potassium persulfate solution react with carbon in an ultra-violet detection chamber, and a plurality of ribs as negative ribs extending from a negative electrode facing surface of the porous membrane, preferably TD or cross MD negative mini-ribs, and even more preferably negative cross ribs designed and optimized to reduce dendrite formation and growth.

To achieve these and other objects, it is proposed that in certain select embodiments, a separator having a porous membrane and an optional fibrous mat (laminated or otherwise adjacent to the porous membrane) be used in a lead acid battery, such as an EFB or deep cycle battery having negative and positive electrodes with the separator disposed therebetween. One or both of the porous membrane or fibrous mat may be provided with natural and/or synthetic rubber and at least one performance enhancing additive impregnated in or coated on at least a portion of either side of either the porous membrane or fibrous mat. Further, the porous membrane may be provided with ribs, in a variety of patterns and orientations, on either or both sides thereof.

In accordance with select embodiments, an improved or novel battery separator is provided with a porous membrane having a backweb with a plurality of ribs extending from at least a portion thereof. The porous membrane may have a composition of a polymer, a filler, at least one performance enhancing additive, a plasticizer, and optionally, a rubber. The separator may have an acid leachable total organic carbon ("TOC") of less than or equal to approximately 2,000 mg per kg of the battery separator as measured by a potassium persulfate solution react with carbon in an ultra-violet detection chamber, and preferably less than or equal to approximately 1,500 mg per kg of the battery separator as measured by a potassium persulfate solution react with carbon in an ultra-violet detection chamber, and more preferably less than or equal to approximately 1,000 mg per kg of the battery separator as measured by a potassium persulfate solution react with carbon in an ultra-violet detection chamber.

A refinement of select embodiments may provide at least a portion of the plurality of ribs as positive ribs extending from a positive electrode facing surface of the porous membrane, at least a portion of the plurality of ribs as negative ribs extending from a negative electrode facing surface of the porous membrane, or the embodiment may be provided with both positive and negative ribs. Either, both, or neither of the positive and negative ribs may uniformly extend from a first lateral edge to a second lateral edge. Either, both, or neither of the positive and negative ribs may also uniformly extend from at top edge to a bottom edge. Either, or both of the positive ribs and negative ribs may be designed and optimized to reduce dendrite formation and growth.

In certain exemplary separators, either sets of positive ribs and/or negative ribs may be any one of the following: solid ribs, discrete broken ribs, continuous ribs, discontinuous ribs, discontinuous peaks, discontinuous protrusions, angled ribs, diagonal ribs, linear ribs, ribs that are longitudinally extending substantially in a machine direction of said porous membrane, ribs that are laterally extending substantially in a cross-machine direction of said porous membrane, ribs that are transversely extending substantially in said cross-machine direction of the separator, discrete teeth, toothed ribs, serrations, serrated ribs, battlements, battlemented ribs, curved ribs, continuous sinusoidal ribs, discontinuous sinusoidal ribs, S-shaped ribs, continuous zig-zag-sawtooth-like ribs, broken discontinuous zig-zag-sawtooth-like ribs, grooves, channels, textured areas, embossments, dimples, columns, mini columns, porous, non-porous, cross ribs, mini ribs, cross-mini ribs, and combinations thereof.

In select exemplary separators, either sets of positive ribs and/or negative ribs may be broken ribs, wherein the ribs have discrete terminal points contained within the edges of the separator and are disconnected to any other ribs. The broken ribs may be defined by an angular orientation to enhance acid mixing in a battery, especially during movement of the battery, with the separator disposed therein and positioned parallel to a start and stop motion of the battery. The angular orientation may be defined relative to the MD of the separator and be an angle of between greater than zero degrees (0°) and less than 180 degrees (180°), or greater than 180 degrees (180°) and less than 360 degrees (360°).

The angular orientation of the ribs may vary throughout the plurality of ribs. In certain select embodiments, exemplary separators may have a plurality of sets of ribs, wherein each set of ribs has a different or same angular orientation compared to the other sets of ribs. In other exemplary separators, the positive and/or negative ribs may have an angular orientation that is between zero degrees (0°) to 360 degrees (360°).

In select embodiments, the positive ribs may have a rib height of approximately 50 μm to approximately 2.0 mm. Further, at least a portion of said positive ribs may have a base width of approximately 300 μm to approximately 750 μm. In some exemplary embodiments, at least a portion of the positive ribs may have a second base width of approximately 400 μm to approximately 500 μm. Should at least a portion of the positive ribs and/or negative ribs be substantially straight and substantially parallel to one another, they may have a spacing length of approximately 50 μm to approximately 20 mm.

In certain exemplary embodiments, the negative ribs may be approximately 5.0% or less to approximately 100% or greater compared to the height of the positive ribs. For example, the battery separator may have negative ribs with a height ranging from approximately 5.0 μm to approximately 2.0 mm. Exemplary negative ribs may have a base width of approximately 5 μm to approximately 500 μm.

In select exemplary embodiments, as aspect of the present invention provides the separator or porous membrane with a composition that may include any or more of the following: a polymer, polyolefin, polyethylene, polypropylene, ultra-high molecular weight polyethylene ("UHMWPE"), phenolic resin, polyvinyl chloride ("PVC"), rubber, synthetic wood pulp ("SWP"), lignins, glass fibers, synthetic fibers, cellulosic fibers, rubber, and combinations thereof.

A refinement of the present inventions provides that the rubber may be any one or more of the following: cross-linked rubber, un-cross-linked rubber, cured rubber, uncured rubber, natural rubber, latex, synthetic rubber, and combinations thereof. Another refinement of the present invention provides that the rubber may be any one or more of the following: methyl rubber, polybutadiene, one or more chloropene rubbers, butyl rubber, bromobutyl rubber, polyurethane rubber, epichlorhydrin rubber, polysulphide rubber, chlorosulphonyl polyethylene, polynorbornene rubber, acrylate rubber, fluorine rubber, silicone rubber, copolymer rubbers, and combinations thereof. Further, the copolymer rubbers may be any one or more of the following: styrene/butadiene rubbers, acrylonitrile/butadiene rubbers, ethylene/propylene rubbers (EPM and EPDM), ethylene/vinyl acetate rubbers, and combinations thereof.

In select embodiments, the rubber may be present at an amount that is approximately 1% by weight to approximately 6% by weight, preferably approximately 3% by weight, preferably approximately 6% by weight, and more preferably 3 approximately 3% by weight to approximately 6% by weight. The rubber may be mixed with the other base materials of the separator, or coated on at least a portion of one or more surfaces of the separator or porous membrane. If coated, the rubber may be applied as a liquid slurry and dried.

Exemplary embodiments of the invention may possess a filler that may be any one or more of the following: silica, dry finely divided silica; precipitated silica; amorphous silica; alumina; talc; fish meal, fish bone meal, and combinations thereof. Further, the silica may have a molecular ratio of OH:Si groups, measured by $^{29}$Si-NMR, that may be within a range of approximately 21:100 to 35:100, approximately 23:100 to approximately 31:100, approximately 25:100 to approximately 29:100, and alternatively at least approximately 27:100 or greater.

An exemplary filler of the present invention, may provide exemplary fillers with a high structural morphology. A refinement of the present invention, may provide an exemplary filler characterized by at least one or more of the following: having an average particle size of 5 μm or less; having a surface area of at least 100 m$^2$/g; having an oil absorption rate of at least 150 ml/100 mg; and combinations thereof.

The separator or porous membrane may have a filler to polymer (filler:polymer) weight ratio of approximately 2.0:1.0 to approximately 4.0:1.0, such as, for example, approximately 2.0:1.0; alternatively approximately 2.6:1.0; and also alternatively approximately 3.5:1.0; and a filler to a combined filler and rubber by weight (filler: polymer and rubber) of approximately 2.0:1.0 to approximately 3.0:1.0, such as 2.6:1.0.

Exemplary porous membranes may have a backweb thickness of approximately 50 μm to approximately 400 μm, preferably approximately 75 μm to approximately 250 μm, preferably approximately 100 μm to approximately 200 μm, preferably approximately 100 μm to approximately 150 μm, and most preferably approximately 75 μm to approximately 125 μm, Exemplary separators according to the present disclosure may possess an overall thickness of approximately 100 μm to approximately 1.0 mm, preferably approximately 100 μm to approximately 850 μm, preferably approximately 100 μm to approximately 650 μm, preferably approximately 100 μm to approximately 450 μm, preferably approximately 100 μm to approximately 250 μm, and most preferably approximately 100 μm to approximately 150 μm.

Another aspect of the present invention may provide at least one performance enhancing additive that may be one or more of the following: surfactants, wetting agents, colorants, antistatic additives, an antimony suppressing additive, UV-protection additives, antioxidants, and combinations thereof. A refinement provides that an exemplary surfactant is one or more of the following: a non-ionic surfactant, an ionic surfactant, an anionic surfactant, a cationic surfactant, and combinations thereof. Further, exemplary performance enhancing additives may possess a lithium ion, an aluminum ion, or both.

Exemplary embodiments may provide a surfactant at an amount of at least approximately 0.5 g/m$^2$ to approximately 6 g/m$^2$, and alternatively approximately 0.5 g/m$^2$ to approximately 3 g/m$^2$. The performance enhancing additive may be, for example, coated on at least a portion of the porous membrane or separator, impregnated within at least a portion of the porous membrane or separator, or mixed with the polymer and filler prior to the extrusion of the porous membrane.

Another aspect of the present invention provides the porous membrane or separator with a processing plasticizer, which may be, for example, processing oil, petroleum oil, paraffin-based mineral oil, mineral oil, and combinations thereof. The plasticizer is typically added to a mix of the polymer, filler, and optionally the performance enhancing additive prior to the extrusion of the porous membrane. After extrusion, a portion of the plasticizer may be extracted by known means.

In some select embodiments, the separator is further provided with a fibrous mat, which may be adhered or bonded to the separator in some fashion or simply placed adjacent thereto. The mat may be composed of any one or more of the following: glass fibers, synthetic fibers, silica, at least one performance enhancing additive, latex, natural rubber, synthetic rubber, or combinations thereof. In addition, the mat may be nonwoven, woven, fleece, net, or combinations thereof.

Exemplary separators may exhibit increased performance parameters, such as a lower electrical resistance ("ER") as compared to conventional separators. For instance, the ER may be less than or equal to approximately 65 mΩ·cm$^2$, preferably less than or equal to approximately 50 mΩ·cm$^2$, and most preferably less than or equal to approximately 35 mΩ·cm$^2$, Exemplary separators may be provided with a conductive layer on one or both positive side and negative side of the separator. In addition, the separator may have an oxidation resistance at 40 hours of approximately 200% or greater.

Furthermore, the separator may take a variety of shapes and/or configurations. For instance, exemplary separators may be any one of the following: a cut piece, a pocket, a sleeve, a wrap, an envelope, hybrid envelope, a S-weave separator, or comprises side folds.

Embodiments of the present invention also provide a battery utilizing a separator as substantially described herein. For example, the battery may be a lead acid battery, such as a flat-plate battery, a flooded lead acid battery, an enhanced flooded lead acid battery ("EFB"), a deep-cycle battery, a gel battery, an absorptive glass mat ("AGM") battery, a tubular battery, an inverter battery, a vehicle battery, a starting-lighting-ignition ("SLI") vehicle battery, an idling-start-stop ("ISS") vehicle battery, an automobile battery, a truck battery, a motorcycle battery, an all-terrain vehicle battery, a forklift battery, a golf cart battery, a hybrid-electric vehicle battery, an electric vehicle battery, an e-rickshaw battery, an e-bike battery, an uninterruptable power supply ("UPS") battery, or a solar or wind power or other renewable energy storage system battery. Exemplary batteries may be used in a partial state of charge with a depth of discharge of between approximately 1% to approximately 99%, and possibly from approximately 1% to approximately 50%, and additionally possible from approximately 50% to approximately 99%. The battery may be utilized while in motion, stationary, in an energy storage system application; in a renewable energy storage system application; in an uninterruptible power supply application; in an energy reserve system application, in a backup power application, in a cycling applications, and combinations thereof.

Other embodiments may include systems that utilizes a battery as substantially described herein. Such systems may include an energy storage system; renewable energy storage system; an uninterruptible power supply; an energy reserve system, a power backup system, and combinations thereof. Such systems may further include vehicles such as an automobile, a truck, a motorcycle, an all-terrain vehicle, a forklift, a golf cart, a hybrid vehicle, a hybrid-electric vehicle battery, an electric vehicle, an idling-start-stop ("ISS") vehicle, a water vessel, an e-rickshaw battery, an e-trike and an e-bike battery.

In certain preferred embodiments, the present disclosure or invention provides a flexible battery separator whose components and physical attributes and features synergistically combine to address, in unexpected ways, previously unmet needs in the deep cycle battery industry, with an improved battery separator (a separator having a porous membrane of polymer, such as polyethylene, plus a certain amount of a performance enhancing additive and ribs) that meets or, in certain embodiments, exceeds the performance of the previously known flexible, which are currently used in many deep cycle battery applications. In particular, the inventive separators described herein are more robust, less fragile, less brittle, more stable over time (less susceptible to degradation) than separators traditionally used with deep cycle batteries. The flexible, performance enhancing additive-containing and rib possessing separators of the present invention combine the desired robust physical and mechanical properties of a polyethylene-based separator with the capabilities of a conventional separator, while also enhancing the performance of the battery system employing the same.

DETAILED DESCRIPTION

Figure 1A:
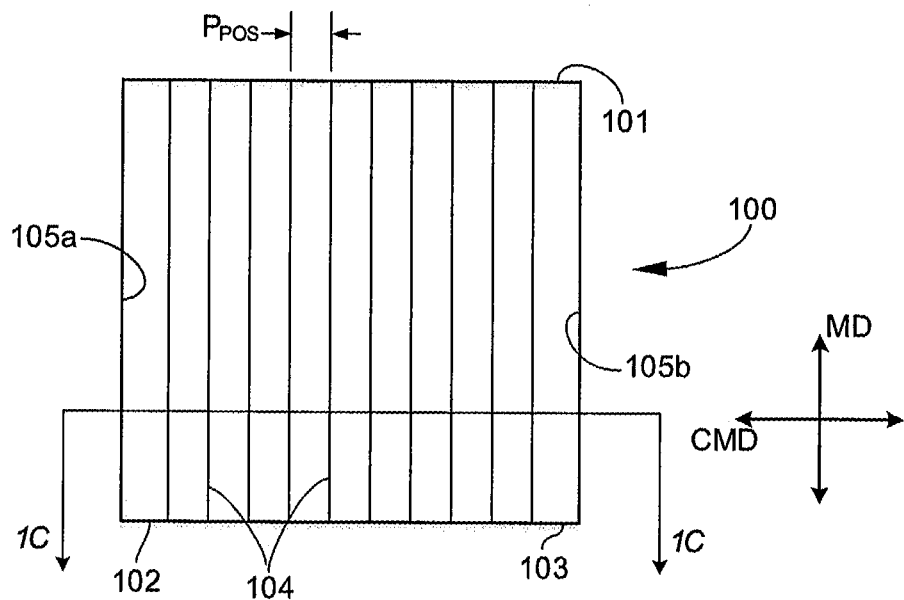
FIGS. 1A, 1B, and 1C depict basic physical characteristics of an exemplary battery separator of the present disclosure.

In accordance with at least select embodiments, the present disclosure or invention may address the above issues or needs. In accordance with at least certain objects, aspects, or embodiments, the present disclosure or invention may provide an improved separator and/or battery which overcomes the aforementioned problems, for instance by providing batteries having reduced acid stratification, mitigating the formation of dendrites, and/or having improved cycling performance.

In accordance with at least select embodiments, the present disclosure or invention is directed to novel or improved separators, cells, batteries, systems, and/or methods of manufacture and/or use of such novel separators, cells, and/or batteries. In accordance with at least certain embodiments, the present disclosure or invention is directed to novel or improved battery separators for flat-plate batteries, tubular batteries, flooded lead acid batteries, enhanced flooded lead acid batteries ("EFBs"), deep-cycle batteries, gel batteries, absorptive glass mat ("AGM") batteries, inverter batteries, solar or wind power storage batteries, vehicle batteries, starting-lighting-ignition ("SLI") vehicle batteries, idling-start-stop ("ISS") vehicle batteries, automobile batteries, truck batteries, motorcycle batteries, all-terrain vehicle batteries, forklift batteries, golf cart batteries, hybrid-electric vehicle batteries, electric vehicle batteries, e-rickshaw batteries, e-bike batteries, and/or improved methods of making and/or using such improved separators, cells, batteries, systems, and/or the like. In addition, disclosed herein are methods, systems and battery separators for enhancing battery performance and life, reducing battery failure, reducing acid stratification, mitigating dendrite formation, improving oxidation stability, improving, maintaining, and/or lowering float current, improving end of charge current, decreasing the current and/or voltage needed to charge and/or fully charge a deep cycle battery, reducing internal electrical resistance, reducing antimony poisoning, increasing wettability, improving acid diffusion, improving uniformity in a lead acid battery, and/or improving cycle performance. In accordance with at least particular embodiments, the present disclosure or invention is directed to an improved separator wherein the novel separator includes decreased electrical resistance, performance enhancing additives or coatings, improved fillers, increased wettability, increased acid diffusion, negative cross ribs, and/or the like. In accordance with at least one very particular embodiment, the present disclosure or invention is directed to an improved separator wherein the novel separator includes or has an acid leachable total organic carbon ("TOC") of less than or equal to approximately 2,000 mg per kg of the battery separator as measured by a potassium persulfate solution react with carbon in an ultra-violet detection chamber, and preferably less than or equal to approximately 1,500 mg per kg of the battery separator as measured by a potassium persulfate solution react with carbon in an ultra-violet detection chamber, more preferably less than or equal to approximately 1,000 mg per kg of the battery separator as measured by a potassium persulfate solution react with carbon in an ultra-violet detection chamber, and a plurality of ribs as negative ribs extending from a negative electrode facing surface of the porous membrane, preferably TD (or cross MD) negative mini-ribs, and even more preferably negative cross ribs (NCR) designed and optimized to add strength, reduce acid stratification, help with gas release, and/or reduce dendrite formation and growth.

Physical Description

Figure 1B:
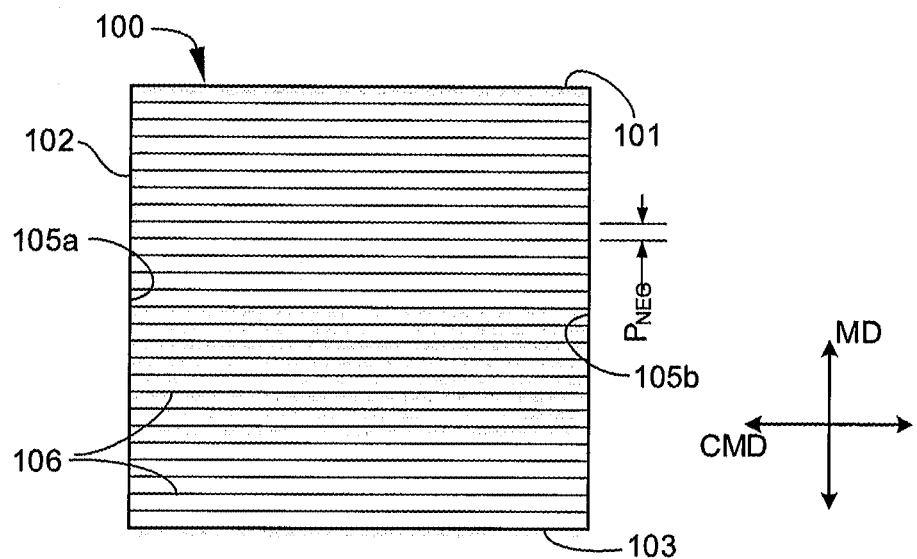
Figure 1C:
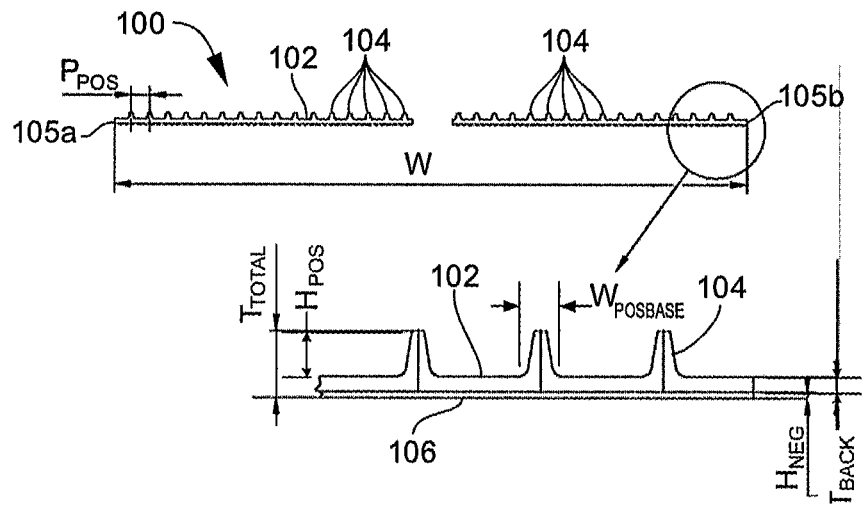

An exemplary separator may be provided with a web of a porous membrane, such as a microporous membrane having pores less than about 5 μm, preferably less than about 1 μm, a mesoporous membrane, or a macroporous membrane having pores greater than about 1 μm. The porous membrane may preferably have a pore size that is sub-micron up to 100 μm, and in certain embodiments between about 0.1 μm to about 10 μm. Porosity of the separator membrane described herein may be greater than 50% to 60% in certain embodiments. In certain select embodiments, the porous membrane may be flat or possess ribs that extend from a surface thereof. As shown in FIGS. 1A-1C, the separator may be defined by a variety of dimensions, which will be explained in detail hereinafter. For instance, the separator may have a backweb thickness $T_{BACK}$, a total thickness $T_{TOTAL}$, a positive rib height $H_{POS}$, a positive rib base width $W_{POSBASE}$, an optional second positive rib base width $W'_{POSBASE}$ (shown in FIG. 1D), a positive rib pitch $P_{POS}$, a negative rib height $H_{NEG}$, a negative rib base width $W_{NEGBASE}$, a negative rib base width $W_{NEGBASE}$, and a negative rib pitch $P_{NEG}$.

With reference now to FIGS. 1A-1C, an exemplary separator 100 is provided with a web of a porous membrane 102. The separator 100 and membrane 102 have a machine direction ("MD") and a cross-machine direction ("CMD"), a top edge 101 and a bottom edge 103 (both substantially parallel to the CMD), and lateral side edges 105a, 105b (both substantially parallel to the MD).

With reference to FIG. 1A, the separator 100 is provided with a positive surface, named so because it faces a positive electrode (not shown) when the separator 100 is disposed within a battery (not shown). FIG. 1A depicts the separator's positive surface. One or more sets of primary or positive ribs 104 may be provided and extend from at least a portion of the positive surface of the porous membrane 102. As shown, the ribs 104 are solid and disposed on the membrane 102 substantially longitudinal, which is substantially parallel to the separator MD. The positive ribs 104 are also depicted as extending uniformly across the entire separator width W from lateral edge 105a to lateral edge 105, this is known as a "universal profile." As shown in FIG. 1C, the separator has a width W that may range from, depending upon the type of battery in which the separator 100 will be used, approximately 40 mm to approximately 170 mm in at least selected embodiments.

With reference to FIG. 1B, the separator 100 is provided with a negative surface, named so because it faces a negative electrode (not shown) when the separator 100 is disposed within a battery (not shown). FIG. 1B depicts the separator's negative surface. One or more sets of secondary or negative ribs 106 may be provided and extend from at least a portion of the negative surface of the porous membrane 102. As shown, the ribs 104 are solid and disposed in an orientation that is orthogonal to the positive ribs 104, which substantially parallel to the separator CMD. As such, the ribs may be said to be disposed transversely, laterally, or be referred to as cross ribs, or negative-cross ribs ("NCR" or "NCRs"). The negative ribs 106 however, need not be orthogonal to the positive ribs 104. They may be the same size, larger, smaller, in the same or different pattern, or combinations thereof.

Lead will go into solution in a water environment and then precipitate in acid. A typical lead acid battery has an electrolyte of a sulfuric acid solution with a specific gravity of approximately 1.28. A lead acid battery will become acid starved during a discharge cycle, meaning that the acid in the electrolyte is consumed in the reaction and the electrolyte is left with a higher water content (i.e. a lower specific gravity). Furthermore, batteries operating in a partial state of charge ("PSOC") are prone to acid stratification. Acid stratification is a condition in which the acid (being denser than water) in the electrolyte solution falls and collects at the bottom of the battery, leaving a higher water content in the electrolyte at the top of the battery. Acid stratification can be mitigated when a battery is over-charged or kept in a state in which the charged capacity is at or near 100%. However, many batteries do not operate under a condition of 100% charge capacity.

Deep cycle batteries, such as those used in golf carts, forklifts, e-rickshaws, e-bikes, idle-stop-start ("ISS") vehicles, and the like, operate nearly constantly in a partial state of charge. Such batteries, with the possible exception of ISS batteries, are used for 8-12 hours or more being discharged before they are charged. Furthermore, the operators of those batteries may not over-charge the batteries before returning them to service. ISS batteries are experience cycles of discharge and brief intermittent charging cycles, and generally rarely achieve a full charge or are overcharged. These batteries and others, are both prone to acid starvation, acid stratification, or both. These batteries are therefore subject to periods (or areas within the battery) in which the electrolyte has a high water concentration. These batteries are also subject to periods (or areas within the battery) in which the electrolyte has a higher acid concentration. Thus, the lead in the electrodes have an opportunity to go into solution within the electrolyte and then precipitate and lead sulfate ($Pb_2SO_4$) crystals. Over time and through many discharge and charge cycles, the lead sulfate crystals build on the surface of the negative electrode and build upon themselves forming dendrites. Severe or large dendrites are big enough to burn through the separator, connect the positive and negative electrodes, and short the battery cell. This can lead to total failure of the battery or at the very least lead to poor performance and a shortened battery life.

The inventors hypothesize that the dendrites begin forming on the negative electrode and grow toward the positive electrode. The inventors further hypothesize that the porous to micro-porous structure of the separator acts as something of a scaffold, giving the lead sulfate crystals a structure from which to build. As the lead sulfate crystals begin forming on the negative electrode, they can attach to the separator and build upon themselves. Over time, the crystals fill the porous structure of the separator to form small dendrites that lead to micro-shorts, which hamper the performance of the battery and may lead to total battery failure. The inventors propose a solution to this problem by reducing the contact between separator and the electrodes, preferably between the separator and the negative electrode but the contact area may also be reduced between the separator and the positive electrode. Reducing the contact between separator and the electrodes may also help reduce acid stratification, enhance acid mixing, enhance the acid reservoir next to the plate or electrode, help release gas, provide a more uniform charge across the plate, and combinations thereof.

Figure 2C:
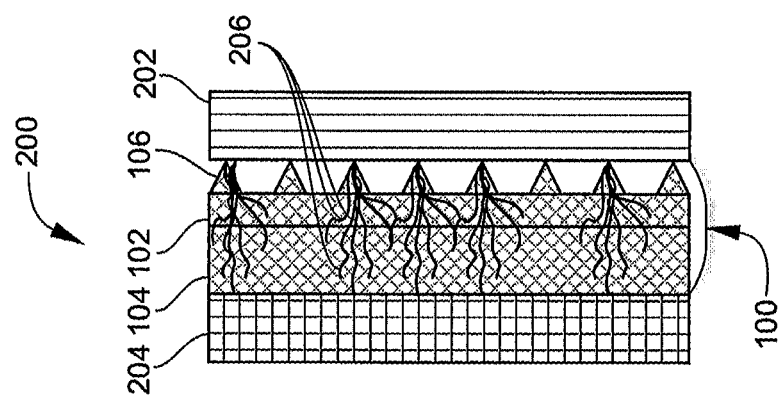
FIGS. 2A-2C show various exemplary separators with differing ribs on the negative surface of the backweb, including a flat backweb void of any ribs, and their likely effect on dendrite growth.
Figure 2B:
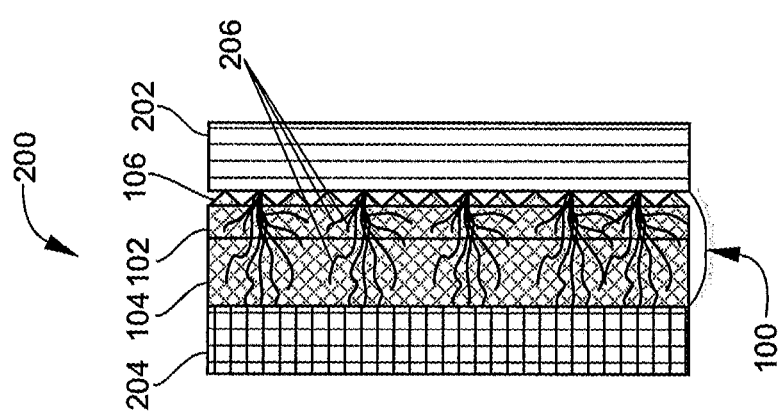
Figure 2A:
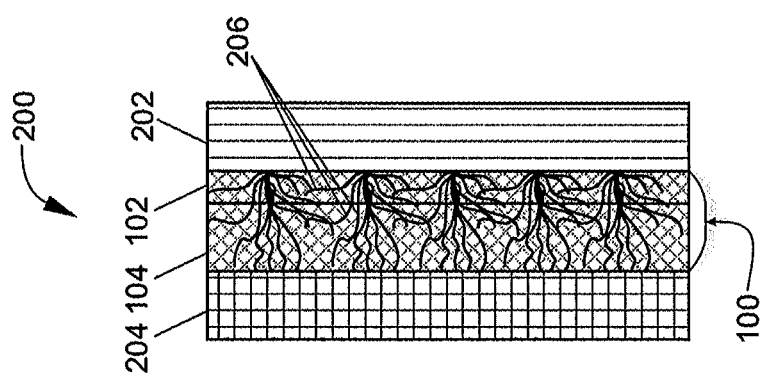

FIGS. 2A-2C illustrate various scenarios of dendrite formation. The FIGS. show various embodiments of a separator 100 disposed between a negative electrode 202 and a positive electrode 204. All separators have positive ribs 104, but only FIGS. 2B and 2C depict a separator 100 with negative electrodes 106. The inventors believe that the more contact a separator 100 has with the negative electrode 202, the more likely dendrites 206 are to form and grow within its porous structure. As shown in FIG. 2A, the back web 102 has a flat surface facing the negative electrode 202. And according to the inventors' hypothesis, dendrites 206 have many opportunities to grow and form a bridge between the negative electrode 202 and the positive electrode 204 within the separator 100. FIG. 2B depicts a separator 100 with negative cross ribs 106, thus reducing the contact area between the separator 100 and the negative electrode 202 and allowing for fewer opportunities for dendrites 206 to form and grow within the separator 100 and form a bridge between the two electrodes 202, 204. As shown in FIG. 2C, the separator 100 is provided with fewer negative cross ribs 106 than that shown in FIG. 2B and they are also spaced farther apart and taller than those shown in FIG. 2B. Thus providing even less contact between the separator 100 and the negative electrode 202, and therefore even fewer opportunities for dendrites 206 to form a bridge from the negative electrode 202 and the positive electrode 204. In accordance with the inventors' hypothesis, it is possible to achieve even fewer opportunities for dendrite 206 growth by making the contact between the ribs 106 and the electrode 202 discontinuous or broken in some fashion. This may be achieved by providing discontinuous, broken, serrated or other forms of ribs wherein there are portions in which the ribs 106 do not contact the surface of the electrode 202. While these examples concentrate on negative ribs 106, the same treatment may also be applied to the positive ribs 104.

Ribs

The ribs 104, 106 may be a uniform set, an alternating set, or a mix or combination of solid, discrete broken ribs, continuous, discontinuous, angled, linear, longitudinal ribs extending substantially in a MD of the separator, lateral ribs extending substantially in a cross-machine direction CMD of the separator, transverse ribs extending substantially in a CMD of the separator, cross ribs extending substantially in a cross-machine direction of the separator, serrations or serrated ribs, battlements or battlemented ribs, curved or sinusoidal, disposed in a solid or broken zig-zag-like fashion, grooves, channels, textured areas, embossments, dimples, porous, non-porous, mini ribs or cross-mini ribs, and/or the like, and combinations thereof. Further, the ribs 104, 106 may extend from or into the positive side, the negative side, or both sides.

Figures 3A, 3B:
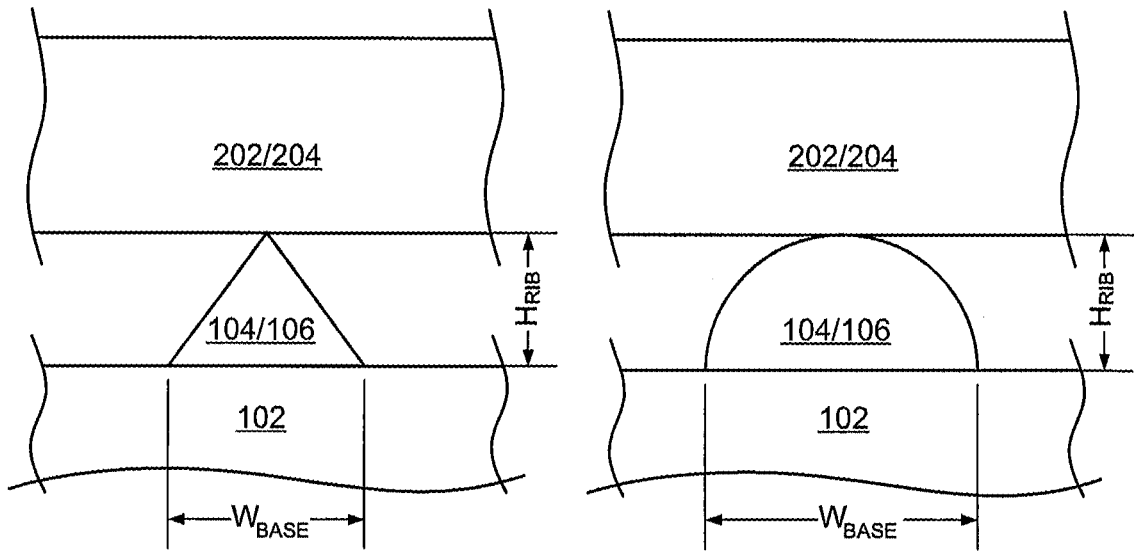
FIGS. 3A, 3B, 3C, and 3D depict various exemplary rib shapes according to the present invention.

FIGS. 3A and 3B depict exemplary embodiments of a separator backweb 102 with ribs 104/106 (either positive ribs or negative ribs) resting adjacent to an electrode 202/204 (either positive electrode or negative electrode). Certain exemplary embodiments of ribs 104/106 (both positive ribs and/or negative ribs) may have a generally triangular shape (FIG. 3A) having a rib base width $W_{BASE}$ and a rib height $H_{RIB}$, or a generally semi-circular shape (FIG. 3B) having a rib base width $W_{BASE}$ and a rib height $H_{RIB}$. As shown in FIG. 3A, the generally triangular shape may be any triangular shape with a single rib base width $W_{BASE}$, such as equilateral, isosceles, or scalene. In addition, the separator may have a mix of separator shapes. As shown in FIG. 3B, the generally semi-circular shape may also be elliptical, oval, or ovoid having a single rib base width $W_{BASE}$. The purpose of the shape is to reduce contact between the separator and the electrode 202/204.

Figure 3C:
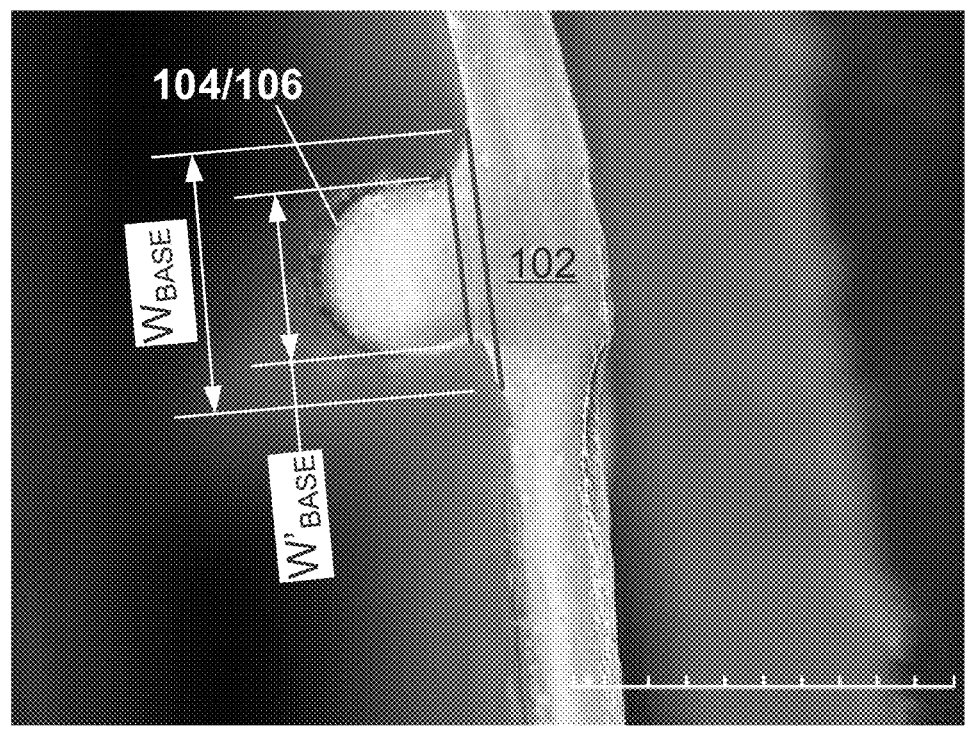
Figure 3D:
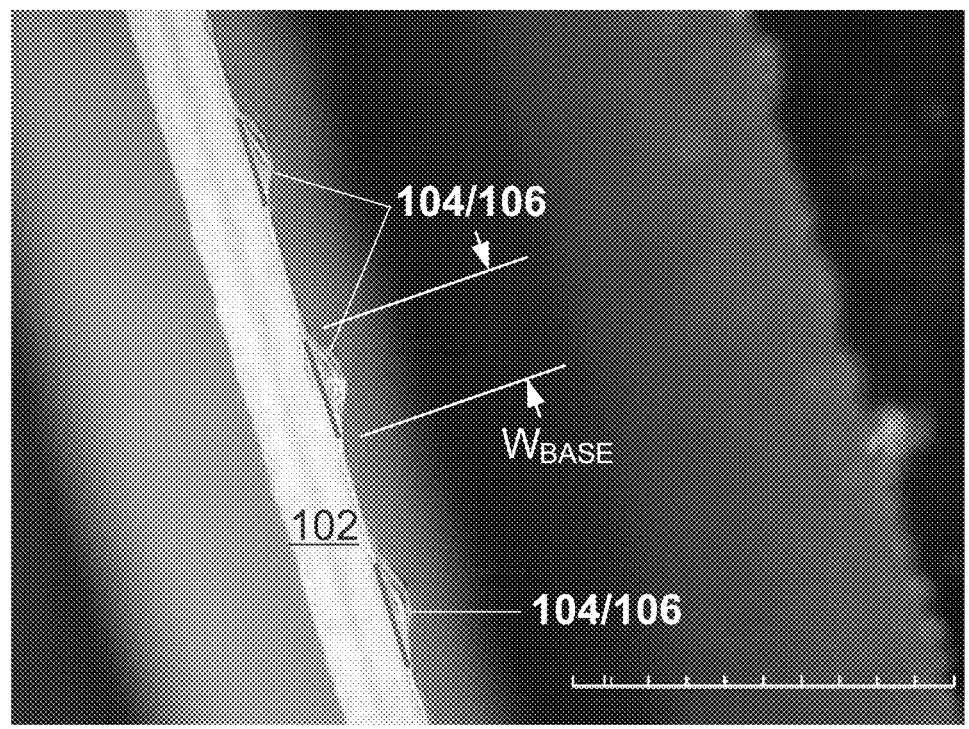

FIG. 3C depicts a rib 104/106 having a generally semi-circular shape. In this embodiment, the rib 104/106 is provided with a first rib base width $W_{BASE}$, and is further provided with an optional second rib base width $W'_{BASE}$, which may be thought of as a neck or necking portion of the rib 104. FIG. 3D depicts a rib 104/106 having a generally isosceles triangular shape with a single rib base width $W_{BASE}$. An exemplary separator may have any mix of shapes, base widths $W_{BASE}$ $W'_{BASE}$, and rib heights $H_{RIB}$.

Referring now to FIGS. 4A-4E, several embodiments of ribbed separators with different rib profiles are depicted. It may be preferred that the shown ribs are positive ribs 104. The angled rib pattern of FIGS. 4A-4C may be a possibly preferred Daramic® RipTide™ acid mixing rib profile that can help reduce or eliminate acid stratification in certain batteries. In some embodiments, the ribs may be discrete broken ribs with an angular orientation relative to the separator MD. The angular orientation may be an angle between greater than zero degrees (0°) and less than 180 degrees (180°) or greater than 180 degrees (180°) and less than 360 degrees (360°). As further shown in FIGS. 4A-4C, the ribs may possess one or more sets of ribs, with each set having varying angular orientations and locations on the separator. The negative face could have no ribs (smooth), the same ribs, smaller ribs, longitudinal mini-ribs, cross mini-ribs or NCRs, diagonal ribs, or combinations thereof.

Figure 4A:
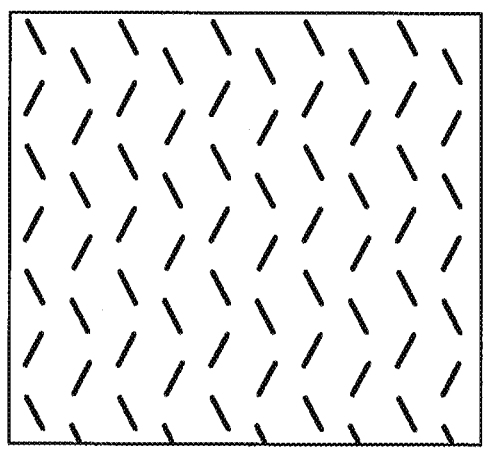
FIGS. 4A, 4B, 4C, 4D, and 4E illustrate a general depiction of various rib patterns of exemplary battery separators of the present disclosure.
Figure 4B:
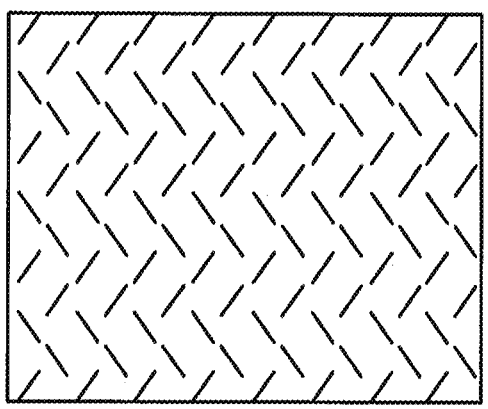
Figure 4C:
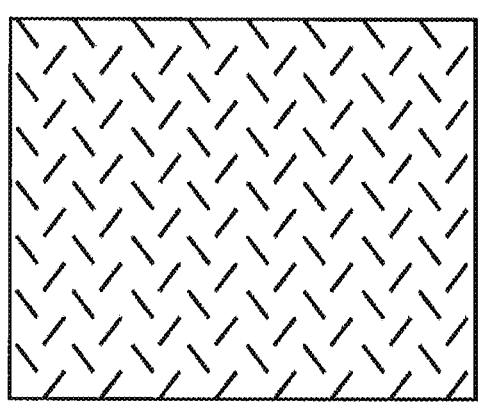
Figure 4D:
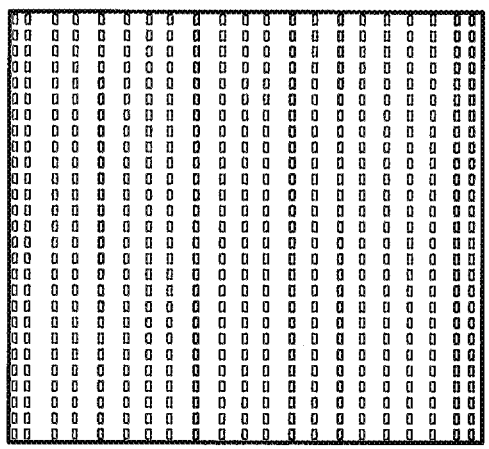
Figure 4E:
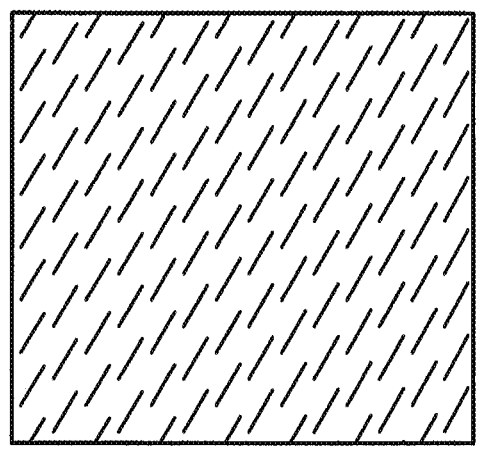

FIG. 4D depicts a profile of a longitudinal serrated rib pattern. FIG. 4E illustrates a profile of a diagonal offset rib pattern. The negative face could have no ribs (smooth), the same ribs, smaller ribs, longitudinal mini-ribs, cross mini-ribs or NCRs, diagonal ribs, or combinations thereof.

As discussed above, the ribs may extend uniformly across the width of the separator, from lateral edge to lateral edge. This is known as a universal profile. Alternatively, the separator may have side panels adjacent to the lateral edges with minor ribs disposed in the side panel. These minor ribs may be more closely spaced and smaller than the primary ribs. For instance, the minor ribs may be 25% to 50% of the height of the primary ribs. The side panels may alternatively be flat. The side panels may assist in sealing an edge of the separator to another edge of the separator as done when enveloping the separator, which is discussed hereinbelow.

In select exemplary embodiments, at least a portion of the positive ribs may preferably have a height ($H_{POS}$ in FIG. 1C) of approximately 50 µm to approximately 2.0 mm. In some exemplary embodiments, the positive rib height $H_{POS}$ may be approximately 50 µm, 100 µm, 200 µm, 300 µm, 400 µm, 500 µm, 600 µm, 700 µm, 800 µm, 900 µm, 1.0 mm, 1.2 mm, 1.4 mm, 1.6 mm, 1.8 mm, or 2.0 mm. In other exemplary embodiments, the positive rib height $H_{POS}$ may be no greater than approximately 2.0 mm, 1.8 mm, 1.6 mm, 1.4 mm, 1.2 mm, 1.0 mm, 900 µm, 800 µm, 700 µm, 600 µm, 500 µm, 400 µm, 300 µm, 200 µm, 100 µm, or 50 µm.

In certain select embodiments, the positive ribs may preferably have a base width ($W_{POSBASE}$ in FIG. 1C) of approximately 300 µm to approximately 750 µm. In some exemplary embodiments, the positive rib base width may be approximately 300 µm, 400 µm, 500 µm, 600 µm, 700 µm, or 750 μm. In some exemplary embodiments, the positive rib base width may be no greater than approximately 750 μm, 700 μm, 600 μm, 500 μm, 400 μm, or 300 μm.

In select embodiments, the positive ribs may have a second width W'$_{POSBASE}$ near the base (like a neck) of approximately 400 μm to approximately 500 μm.

Should a portion of the positive ribs be substantially straight and substantially parallel to one another, they may possess a spacing length or pitch (P$_{POS}$ in FIG. 1C) of approximately 50 μm to approximately 20 mm. In some exemplary embodiments, the positive rib pitch may be approximately 50 μm, 100 μm, 200 μm, 300 μm, 400 μm, 500 μm, 600 μm, 700 μm, 800 μm, 900 μm, 1.0 mm, 2.0 mm, 3.0 mm, 4.0 mm, or 5.0 mm, 6.0 mm, 7.0 mm, 8.0 mm, 9.0 mm, or 10.0 mm, 11.0 mm, 12.0 mm, 13.0 mm, 14.0 mm, or 15.0 mm, 16.0 mm, 17.0 mm, 18.0 mm, 19.0 mm, or 20.0 mm. In other exemplary embodiments, the positive rib pitch may be no greater than approximately 20.0 mm, 19.0 mm, 18.0 mm, 17.0 mm, or 16.0 mm, 15.0 mm, 14.0 mm, 13.0 mm, 12.0 mm, or 11.0 mm, 10.0 mm, 9.0 mm, 8.0 mm, 7.0 mm, or 6.0 mm 5.0 mm, 4.0 mm, 3.0 mm, 2.0 mm, 1.0 mm, 900 μm, 800 μm, 700 μm, 600 μm, 500 μm, 400 μm, 300 μm, 200 μm, 100 μm, or 50 μm.

In select exemplary embodiments, at least a portion of the negative ribs may preferably have a height of approximately 5% to approximately 100% of the height of the positive ribs. In some exemplary embodiments, the negative rib height may be approximately 5%, 10%, 15%, 20%, 25%, 30%, 35%, 40%, 45%, 50%, 55%, 60%, 65%, 70%, 75%, 80%, 95%, or 100% compared to the positive rib height. In other exemplary embodiments, the negative rib height may no greater than approximately 100%, 95%, 90%, 85%, 80%, 75%, 70%, 65%, 60%, 55%, 50%, 45%, 40%, 35%, 30%, 25%, 20%, 15%, 10%, or 5% compared to the positive rib height.

In select exemplary embodiments, at least a portion of the negative ribs may preferably have a height (H$_{NEG}$ in FIG. 1C) of approximately 5 μm to approximately 1.0 mm. In certain embodiments, the negative rib height H$_{NEG}$ may be approximately 5 μm, 10 μm, 25 μm, 50 μm, 100 μm, 200 μm, 300 μm, 400 μm, 500 μm, 600 μm, 700 μm, 800 μm, 900 μm, 1.0 mm, 1.2 mm, 1.4 mm, 1.6 mm, 1.8 mm, or 2.0 mm. In other exemplary embodiments, the positive rib height H$_{NEG}$ may be no greater than approximately 2.0 mm, 1.8 mm, 1.6 mm, 1.4 mm, 1.2 mm, 1.0 mm, 900 μm, 800 μm, 700 μm, 600 μm, 500 μm, 400 μm, 300 μm, 200 μm, 100 μm, or 50 μm., 25 μm, 10 μm, or 5 μm.

In certain exemplary embodiments, at least a portion of the negative ribs may preferably have a base width of approximately 5 μm to approximately 1.0 mm. For instance, the negative base width may be approximately 5 μm, 10 μm, 25 μm, 25 μm, 75 μm, 100 μm, 150 μm, 200 μm, 250 μm, 300 μm, 350 μm, 400 μm, 450 μm, 500 μm, 550 μm, 600 μm, 650 μm, 700 μm, 750 μm, 800 μm, 850 μm, 900 μm, 950 μm, or 1.0 mm. In other embodiments, the negative base width may be no greater than approximately 1.0 mm, 900 μm, 800 μm, 700 μm, 600 μm, 500 μm, 400 μm, 300 μm, 200 μm, 150 μm, 100 μm, 75 μm, 50 μm, 25 μm, 10 μm, or 5 μm.

Should a portion of the negative ribs be substantially straight and substantially parallel to one another, they may possess a spacing length or pitch (P$_{NEG}$ in FIG. 1B) of approximately 50 μm to approximately 20.0 mm. In some exemplary embodiments, the negative rib pitch may be approximately 50 μm, 100 μm, 200 μm, 300 μm, 400 μm, 500 μm, 600 μm, 700 μm, 800 μm, 900 μm, 1.0 mm, 2.0 mm, 3.0 mm, 4.0 mm, or 5.0 mm, 6.0 mm, 7.0 mm, 8.0 mm, 9.0 mm, or 10.0 mm, 11.0 mm, 12.0 mm, 13.0 mm, 14.0 mm, or 15.0 mm, 16.0 mm, 17.0 mm, 18.0 mm, 19.0 mm, or 20.0 mm. In other embodiments, the negative rib pitch may be no greater than approximately 20.0 mm, 19.0 mm, 18.0 mm, 17.0 mm, or 16.0 mm, 15.0 mm, 14.0 mm, 13.0 mm, 12.0 mm, or 11.0 mm, 10.0 mm, 9.0 mm, 8.0 mm, 7.0 mm, or 6.0 mm 5.0 mm, 4.0 mm, 3.0 mm, 2.0 mm, 1.0 mm, 900 μm, 800 μm, 700 μm, 600 μm, 500 μm, 400 μm, 300 μm, 200 μm, 100 μm, or 50 μm.

In some select embodiments, at least a portion of the porous membrane may have negative ribs that are longitudinal or transverse or cross-ribs. The negative ribs may be parallel to the top edge of the separator, or may be disposed at an angle thereto. For instance, the negative ribs may be oriented approximately 0°, 5°, 15°, 25°, 30°, 45°, 60°, 70°, 80°, or 90° relative to the top edge. The cross-ribs may be oriented approximately 0° to approximately 30°, approximately 30° to approximately 45°, approximately 45° to approximately 60°, approximately 30° to approximately 60°, approximately 30° to approximately 90°, or approximately 60° to approximately 90° relative to the top edge.

Certain exemplary embodiments may possess serrations or serrated ribs. If present, they may have an average tip length of from approximately 50 μm to approximately 1.0 mm. For example, the average tip length may be greater than or equal to approximately 50 μm, 100 μm, 200 μm, 300 μm, 400 μm, 500 μm, 600 μm, 700 μm, 800 μm, 900 μm, or 1.0 mm. Alternatively, they may be no greater than or equal to 1.0 mm, 900 μm, 800 μm, 700 μm, 600 μm, 500 μm, 400 μm, 300 μm, 200 μm, 100 μm, or 50 μm.

At least a portion of the serrations or serrated ribs may have an average base length of from approximately 50 μm to approximately 1.0 mm. For example, the average base length may be approximately 50 μm, 100 μm, 200 μm, 300 μm, 400 μm, 500 μm, 600 μm, 700 μm, 800 μm, 900 μm, or 1.0 mm. Alternatively, they may be no greater than or equal to approximately 1.0 mm, 900 μm, 800 μm, 700 μm, 600 μm, 500 μm, 400 μm, 300 μm, 200 μm, 100 μm, or 50 μm.

At least a portion of the serrations or serrated ribs may have an average height of from approximately 50 μm to approximately 1.0 mm. For example, the average height may be approximately 50 μm, 100 μm, 200 μm, 300 μm, 400 μm, 500 μm, 600 μm, 700 μm, 800 μm, 900 μm, or 1.0 mm. Alternatively, they may be no greater than or equal to approximately 1.0 mm, 900 μm, 800 μm, 700 μm, 600 μm, 500 μm, 400 μm, 300 μm, 200 μm, 100 μm, or 50 μm. For embodiments in which the serration height is the same as the rib height, the serrated ribs may also be referred to as protrusions. Such ranges may apply to separators for industrial traction-type start/stop batteries, where the total thickness T$_{TOTAL}$ of the separator may typically be about 1 mm to about 4 mm, as well as automotive start/stop batteries, where the total thickness T$_{TOTAL}$ of the separator may be a little less (e.g., typically about 0.3 mm to about 1 mm).

At least a portion of the serrations or serrated ribs may have an average center-to-center pitch within a column in the machine direction of from approximately 100 μm to approximately 50 mm. For example, the average center-to-center pitch may be greater than or equal to approximately 50 μm, 100 μm, 200 μm, 300 μm, 400 μm, 500 μm, 600 μm, 700 μm, 800 μm, 900 μm, or 1.0 mm, and in similar increments up to 50 mm. Alternatively, they may be no greater than or equal to approximately 50 μm, 100 μm, 200 μm, 300 μm, 400 μm, 500 μm, 600 μm, 700 μm, 800 μm, 900 μm, or 1.0 mm, and in similar increments up to 50 mm. In addition, adjacent columns of serrations or serrated ribs may be identically disposed at the same position in a machine direction or offset. In an offset configuration, adjacent serrations or serrated ribs are disposed at different positions in the machine direction.

At least a portion of the serrations or serrated ribs may have an average height to base width ratio of from approximately 0.1:1.0 to approximately 500:1.0. For example, the average height to base width ratio may be approximately 0.1:1.0, 25:1.0, 50:1.0, 100:1.0, 150:1.0, 200:1.0, 250:1.0, 300:1.0, 350:1, 450:1.0, or 500:1.0. Alternatively, the average height to base width ratio may be no greater than or equal to approximately 500:1.0, 450:1.0, 400:1.0, 350:1.0, 300:1.0, 250:1.0, 200:1.0, 150:1.0, 100:1.0, 50:1.0, 25:1.0, or 0.1:1.0.

At least a portion of the serrations or serrated ribs can have average base width to tip width ratio of from approximately 1,000:1.0 to approximately 0.1:1.0. For example, the average base width to tip width ratio may be approximately 0.1:1.0, 1.0:1.0, 2:1.0, 3:1.0, 4:1.0, 5:1.0, 6:1.0, 7:1.0, 8:1.0, 9:1.0, 10:1.0, 15:1.0, 20:1.0, 25:1.0, 50:1.0, 100:1.0, 150:1.0, 200:1.0, 250:1.0, 300:1.0, 350:1.0, 450:1.0, 500:1.0, 550:1.0, 600:1.0, 650:1.0, 700:1.0, 750:1.0, 800:1.0, 850:1.0, 900:1.0, 950:1.0, or 1,000:1.0.

Alternatively, the average base width to tip width ratio may be no greater than approximately 1,000:1.0, 950:1.0, 900:1.0, 850:1.0, 800:1.0, 750:1.0, 700:1.0, 650:1.0, 600:1.0, 550:1.0, 500:1.0, 450:1.0, 400:1.0, 350:1.0, 300:1.0, 250:1.0, 200:1.0, 150:1.0, 100:1.0, 50:1.0, 25:1.0, 20:1.0, 15:1.0, 10:1.0, 9:1.0, 8:1.0, 7:1.0, 6:1.0, 5:1.0, 4:1.0, 3:1.0, 2:1.0, 1.0:1.0, or 0.1:1.0.

Backweb Thickness

In some embodiments, the porous separator membrane can have a backweb thickness $T_{BACK}$ from approximately 50 µm to approximately 1.0 mm. for example, the backweb thickness $T_{BACK}$ may be may be approximately 50 µm, 75 µm, 100 µm, 200 µm, 300 µm, 400 µm, 500 µm, 600 µm, 700 µm, 800 µm, 900 µm, or 1.0 mm. In other exemplary embodiments, the backweb thickness $T_{BACK}$ may be no greater than approximately 1.0 mm, 900 µm, 800 µm, 700 µm, 600 µm, 500 µm, 400 µm, 300 µm, 200 µm, 100 µm, or 50 µm. Though in certain embodiments, a very thin flat backweb thickness of 50 µm or thinner is provided, for example, between approximately 10 µm to approximately 50 µm thick.

Envelope/Form

The separator 100 may be provided as a flat sheet, a leaf or leaves, a wrap, a sleeve, or as an envelope or pocket separator. An exemplary envelope separator may envelope a positive electrode ("positive enveloping separator"), such that the separator has two interior sides facing the positive electrode and two exterior sides facing adjacent negative electrodes. Alternatively, another exemplary envelope separator may envelope a negative electrode ("negative enveloping separator"), such that the separator has two interior sides facing the negative electrode and two exterior sides facing adjacent positive electrodes. In such enveloped separators, the bottom edge 103 may be a folded or a sealed crease edge. Further, the lateral edges 105a, 105b may be continuously or intermittently sealed seam edges. The edges may be bonded or sealed by adhesive, heat, ultrasonic welding, and/or the like, or any combination thereof.

Certain exemplary separators may be processed to form hybrid envelopes. The hybrid envelope may be provided by forming one or more slits or openings before, during or after, folding the separator sheet in half and bonding edges of the separator sheet together so as to form an envelope. The length of the openings may be at least 1/50th, 1/25th, 1/20th, 1/15th, 1/10th, 1/8th, 1/5th, 1/4th, or 1/3rd the length of the entire edge. The length of the openings may be 1/50th to 1/3rd, 1/25th to 1/3rd, 1/20th to 1/3rd, 1/20th to 1/4th, 1/15th to 1/4th, 1/15th to 1/5th or 1/10th to 1/5th the length of the entire edge. The hybrid envelope can have 1-5, 1-4, 2-4, 2-3 or 2 openings, which may or may not be equally disposed along the length of the bottom edge. It is preferred that no opening is in the corner of the envelope. The slits may be cut after the separator has been folded and sealed to give an envelope, or the slits may be formed prior to shaping the porous membrane into the envelope.

Some other exemplary embodiments of separator assembly configurations include: the ribs 104 facing a positive electrode; the ribs 104 facing a negative electrode; a negative or positive electrode envelope; a negative or positive electrode sleeve, a negative or positive electrode hybrid envelope; both electrodes may be enveloped or sleeved, and any combination thereof.

Composition

In certain embodiments, the improved separator may include a porous membrane may be made of: a natural or synthetic base material; a processing plasticizer; a filler; natural or synthetic rubber(s) or latex, and one or more other additives and/or coatings, and/or the like.

Base Materials

In certain embodiments, exemplary natural or synthetic base materials may include: polymers; thermoplastic polymers; phenolic resins; natural or synthetic rubbers; synthetic wood pulp; lignins; glass fibers; synthetic fibers; cellulosic fibers; and any combination thereof. In certain preferable embodiments, an exemplary separator may be a porous membrane made from thermoplastic polymers. Exemplary thermoplastic polymers may, in principle, include all acid-resistant thermoplastic materials suitable for use in lead acid batteries. In certain preferred embodiments, exemplary thermoplastic polymers may include polyvinyls and polyolefins. In certain embodiments, the polyvinyls may include, for example, polyvinyl chloride ("PVC"). In certain preferred embodiments, the polyolefins may include, for example, polyethylene, polypropylene, ethylene-butene copolymer, and any combination thereof, but preferably polyethylene. In certain embodiments, exemplary natural or synthetic rubbers may include, for example, latex, uncross-linked or cross-linked rubbers, crumb or ground rubber, and any combination thereof.

Polyolefins

In certain embodiments, the porous membrane layer preferably includes a polyolefin, specifically polyethylene. Preferably, the polyethylene is high molecular weight polyethylene ("HMWPE"), (e.g., polyethylene having a molecular weight of at least 600,000). Even more preferably, the polyethylene is ultra-high molecular weight polyethylene ("UHMWPE"). Exemplary UHMWPE may have a molecular weight of at least 1,000,000, in particular more than 4,000,000, and most preferably 5,000,000 to 8,000,000 as measured by viscosimetry and calculated by Margolie's equation. Further, exemplary UHMWPE may possess a standard load melt index of substantially zero (0) as measured as specified in ASTM D 1238 (Condition E) using a standard load of 2,160 g. Moreover, exemplary UHMWPE may have a viscosity number of not less than 600 ml/g, preferably not less than 1,000 ml/g, more preferably not less than 2,000 ml/g, and most preferably not less than 3,000 ml/g, as determined in a solution of 0.02 g of polyolefin in 100 g of decalin at 130° C.

Rubber

The novel separator disclosed herein may contain latex and/or rubber. As used herein, rubber shall describe, rubber, latex, natural rubber, synthetic rubber, cross-linked or uncross-linked rubbers, cured or uncured rubber, crumb or ground rubber, or mixtures thereof. Exemplary natural rubbers may include one or more blends of polyisoprenes, which are commercially available from a variety of suppliers. Exemplary synthetic rubbers include methyl rubber, polybutadiene, chloropene rubbers, butyl rubber, bromobutyl rubber, polyurethane rubber, epichlorhydrin rubber, polysulphide rubber, chlorosulphonyl polyethylene, polynorbornene rubber, acrylate rubber, fluorine rubber and silicone rubber and copolymer rubbers, such as styrene/butadiene rubbers, acrylonitrile/butadiene rubbers, ethylene/propylene rubbers ("EPM" and "EPDM") and ethylene/vinyl acetate rubbers. The rubber may be a cross-linked rubber or an uncross-linked rubber; in certain preferred embodiments, the rubber is uncross-linked rubber. In certain embodiments, the rubber may be a blend of cross-linked and uncross-linked rubber.

Plasticizer

In certain embodiments, exemplary processing plasticizers may include processing oil, petroleum oil, paraffin-based mineral oil, mineral oil, and any combination thereof.

Fillers

The separator can contain a filler having a high structural morphology. Exemplary fillers can include: silica, dry finely divided silica; precipitated silica; amorphous silica; highly friable silica; alumina; talc; fish meal; fish bone meal; carbon; carbon black; and the like, and combinations thereof. In certain preferred embodiments, the filler is one or more silicas. High structural morphology refers to increased surface area. The filler can have a high surface area, for instance, greater than 100 m2/g, 110 m2/g, 120 m2/g, 130 m2/g, 140 m2/g, 150 m2/g, 160 m2/g, 170 m2/g, 180 m2/g, 190 m2/g, 200 m2/g, 210 m2/g, 220 m2/g, 230 m2/g, 240 m2/g, or 250 m2/g. In some embodiments, the filler (e.g., silica) can have a surface area from 100-300 m2/g, 125-275 m2/g, 150-250 m2/g, or preferably 170-220 m2/g. Surface area can be assessed using TriStar 3000™ for multipoint BET nitrogen surface area. High structural morphology permits the filler to hold more oil during the manufacturing process. For instance, a filler with high structural morphology has a high level of oil absorption, for instance, greater than about 150 ml/100 g, 175 ml/100 g, 200 ml/100 g, 225 ml/100 g, 250 ml/100 g, 275 ml/100 g, 300 ml/100 g, 325 ml/100 g, or 350 ml/100 g. In some embodiments the filler (e.g., silica) can have an oil absorption from 200-500 ml/100 g, 200-400 ml/100 g, 225-375 ml/100 g, 225-350 ml/100 g, 225-325 ml/100 g, preferably 250-300 ml/100 g. In some instances, a silica filler is used having an oil absorption of 266 ml/100 g. Such a silica filler has a moisture content of 5.1%, a BET surface area of 178 m2/g, an average particle size of 23 μm, a sieve residue 230 mesh value of 0.1%, and a bulk density of 135 g/L.

Silica with relatively high levels of oil absorption and relatively high levels of affinity for the plasticizer (e.g., mineral oil) becomes desirably dispersible in the mixture of polyolefin (e.g., polyethylene) and the plasticizer when forming an exemplary lead acid battery separator of the type shown herein. In the past, some separators have experienced the detriment of poor dispersibility caused by silica aggregation when large amounts of silica are used to make such separators or membranes. In at least certain of the inventive separators shown and described herein, the polyolefin, such as polyethylene, forms a shish-kebab structure, since there are few silica aggregations or agglomerates that inhibit the molecular motion of the polyolefin at the time of cooling the molten polyolefin. All of this contributes to improved ion permeability through the resulting separator membrane, and the formation of the shish-kebab structure or morphology means that mechanical strength is maintained or even improved while a lower overall ER separator is produced.

In some select embodiments, the filler (e.g., silica) has an average particle size no greater than 25 μm, in some instances, no greater than 22 μm, 20 μm, 18 μm, 15 μm, or 10 μm. In some instances, the average particle size of the filler particles is 15-25 μm. The particle size of the silica filler and/or the surface area of the silica filler contributes to the oil absorption of the silica filler. Silica particles in the final product or separator may fall within the sizes described above. However, the initial silica used as raw material may come as one or more agglomerates and/or aggregates and may have sizes around 200 μm or more.

In some preferred embodiments, the silica used to make the inventive separators has an increased amount of or number of surface silanol groups (surface hydroxyl groups) compared with silica fillers used previously to make lead acid battery separators. For example, the silica fillers that may be used with certain preferred embodiments herein may be those silica fillers having at least 10%, at least 15%, at least 20%, at least 25%, at least 30%, or at least 35% more silanol and/or hydroxyl surface groups compared with known silica fillers used to make known polyolefin lead acid battery separators.

The ratio (Si—OH)/Si of silanol groups (Si—OH) to elemental silicon (Si) can be measured, for example, as follows.

1. Freeze-crush a polyolefin porous membrane (where certain inventive membranes contain a certain variety of oil-absorbing silica according to the present invention), and prepare the powder-like sample for the solid-state nuclear magnetic resonance spectroscopy (29Si-NMR).

2. Perform the 29Si-NMR to the powder-like sample, and observe the spectrums including the Si spectrum strength which is directly bonding to a hydroxyl group (Spectrum: Q2 and Q3) and the Si spectrum strength which is only directly bonding to an oxygen atom (Spectrum: Q4), wherein the molecular structure of each NMR peak spectrum can be delineated as follows:

$Q_2$: $(SiO)_2$—Si*—$(OH)_2$: having two hydroxyl groups
$Q_3$: $(SiO)_3$—Si*—(OH): having one hydroxyl group
$Q_4$: $(SiO)_4$—Si*: All Si bondings are SiO
Where Si* is proved element by NMR observation.

3. The conditions for 29Si-NMR used for observation are as follows:
Instrument: Bruker BioSpin Avance 500
Resonance Frequency: 99.36 MHz
Sample amount: 250 mg
NMR Tube: 7 mφ
Observing Method: DD/MAS
Pulse Width: 45°
Repetition time: 100 sec
Scans: 800
Magic Angle Spinning: 5,000 Hz
Chemical Shift Reference: Silicone Rubber as −22.43 ppm (External Ref)

4. Numerically, separate peaks of the spectrum, and calculate the area ratio of each peak belonging to Q2, Q3 and Q4. After that, based on the ratios, calculate the molar ratio of hydroxyl groups (—OH) bonding directly to Si. The conditions for the numerical peak separation is conducted in the following manner:
Fitting region: −80 to −130 ppm
Initial peak top: −93 ppm for $Q_2$, −101 ppm for $Q_3$, −111 ppm for $Q_4$, respectively.

Initial full width half maximum: 400 Hz for Q2, 350 Hz for $Q_3$, 450 Hz for Q4, respectively.

Gaussian function ratio: 80% at initial and 70 to 100% while fitting.

5. The peak area ratios (Total is 100) of Q2, Q3, and Q4 are calculated based on the each peak obtained by fitting. The NMR peak area corresponded to the molecular number of each silicate bonding structure (thus, for the Q4 NMR peak, four Si—O—Si bonds are present within that silicate structure; for the Q3 NMR peak, three Si—O—Si bonds are present within that silicate structure while one Si—OH bond is present; and for the Q2 NMR peak, two Si—O—Si bonds are present within that silicate structure while two Si—OH bonds are present). Therefore each number of the hydroxyl group (—OH) of Q2, Q3, and Q4 is multiplied by two (2) one (1), and zero (0), respectively. These three results are summed. The summed value displays the mole ratio of hydroxyl groups (—OH) directly bonding to Si.

In certain embodiments, the silica may have a molecular ratio of OH to Si groups, measured by $^{29}$Si-NMR, that may be within a range of approximately 21:100 to 35:100, in some preferred embodiments approximately 23:100 to approximately 31:100, in certain preferred embodiments, approximately 25:100 to approximately 29:100, and in other preferred embodiments at least approximately 27:100 or greater.

In some select embodiments, use of the fillers described above permits the use of a greater proportion of processing oil during the extrusion step. As the porous structure in the separator is formed, in part, by removal of the oil after the extrusion, higher initial absorbed amounts of oil results in higher porosity or higher void volume. While processing oil is an integral component of the extrusion step, oil is a non-conducting component of the separator. Residual oil in the separator protects the separator from oxidation when in contact with the positive electrode. The precise amount of oil in the processing step may be controlled in the manufacture of conventional separators. Generally speaking, conventional separators are manufactured using 50-70% processing oil, in some embodiments, 55-65%, in some embodiments, 60-65%, and in some embodiments, about 62% by weight processing oil. Reducing oil below about 59% is known to cause burning due to increased friction against the extruder components. However, increasing oil much above the prescribed amount may cause shrinking during the drying stage, leading to dimensional instability. Although previous attempts to increase oil content resulted in pore shrinkage or condensation during the oil removal, separators prepared as disclosed herein exhibit minimal, if any, shrinkage and condensation during oil removal. Thus, porosity can be increased without compromising pore size and dimensional stability, thereby decreasing electrical resistance.

In certain select embodiments, the use of the filler described above allows for a reduced final oil concentration in the finished separator. Since oil is a non-conductor, reducing oil content can increase the ionic conductivity of the separator and assist in lowering the ER of the separator. As such, separators having reduced final oil contents can have increased efficiency. In certain select embodiments are provided separators having a final processing oil content (by weight) less than 20%, for example, between about 14% and 20%, and in some particular embodiments, less than 19%, 18%, 17%, 16%, 15%, 14%, 13%, 12%, 11%, 10%, 9%, 8%, 7%, 6%, or 5%.

The fillers may further reduce what is called the hydration sphere of the electrolyte ions, enhancing their transport across the membrane, thereby once again lowering the overall electrical resistance or ER of the battery, such as an enhanced flooded battery or system.

The filler or fillers may contain various species (e.g., polar species, such as metals) that facilitate the flow of electrolyte and ions across the separator. Such also leads to decreased overall electrical resistance as such a separator is used in a flooded battery, such as an enhanced flooded battery.

Fillers (e.g., silica) may contain trace elements, such as sodium. The inventors have discovered that a reduction in sodium can increase cold-cranking amps ("CCA"). For instance, exemplary separators with a 60% (by weight) reduction in sodium (as compared to typical commercially available separators) have a 10% increase in CCA. Such reduced amounts of sodium in a finished separator sheet may be in the range of 0.020 $g/m^2$ to 0.060 $g/m^2$ or lower.

Friability

In certain select embodiments, the filler can be an alumina, talc, silica, or a combination thereof. In some embodiments, the filler can be a precipitated silica, and in some embodiments, the precipitated silica is amorphous silica. In some embodiments, it is preferred to use aggregates and/or agglomerates of silica which allow for a fine dispersion of filler throughout the separator, thereby decreasing tortuosity and electrical resistance. In certain preferred embodiments, the filler (e.g., silica) is characterized by a high level of friability. Good friability enhances the dispersion of the filler throughout the polymer during extrusion of the porous membrane, enhancing porosity and thus overall ionic conductivity through the separator.

Figure 5:
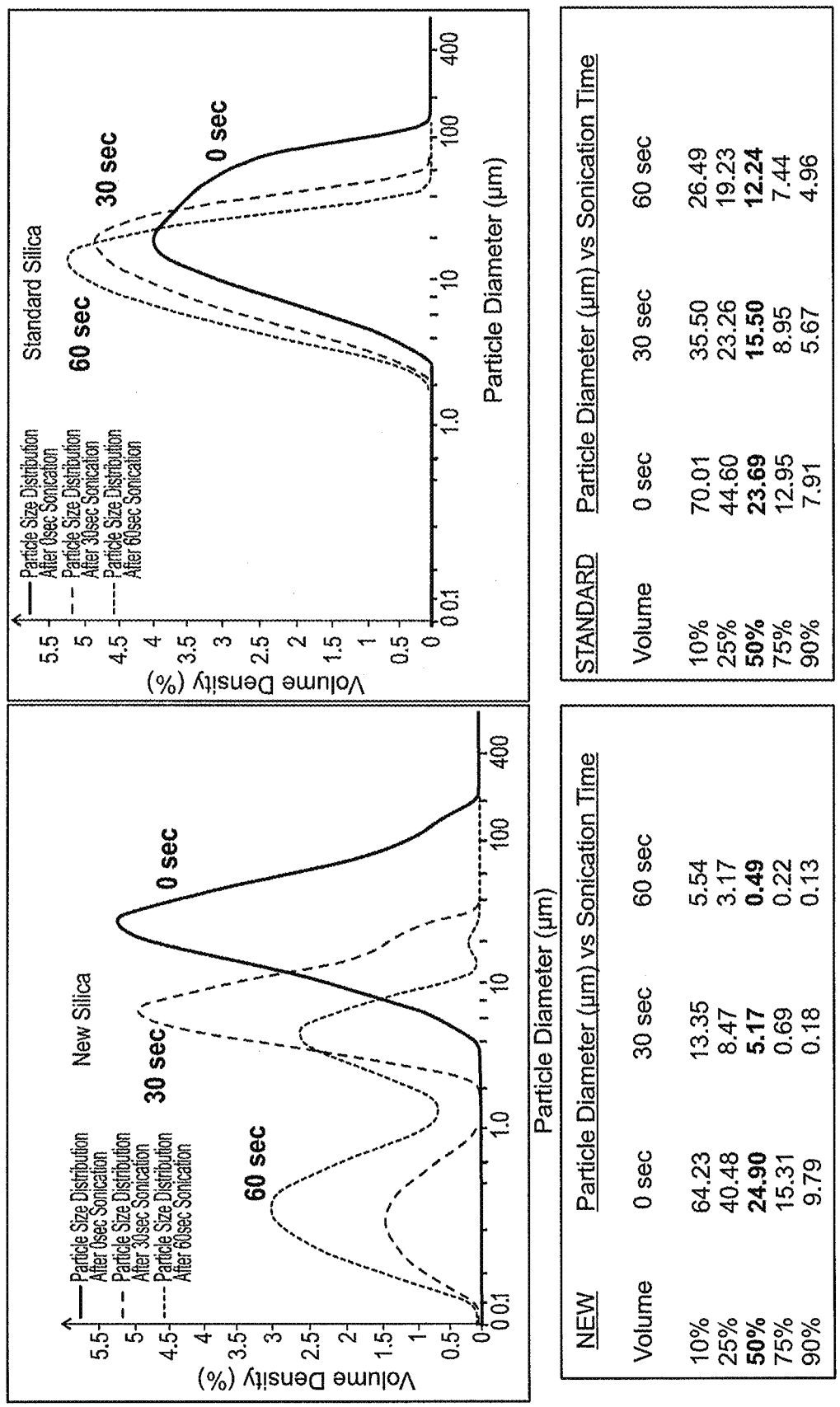
FIG. 5 shows the silica size before and after sonication, and further depicts the particle size distribution of the new silica and standard silica before sonication and after 30 seconds and 60 seconds of sonication.

Friability may be measured as the ability, tendency or propensity of the silica particles or material (aggregates or agglomerates) to be broken down into smaller sized and more dispersible particles, pieces or components. As shown on the left side of FIG. 5, the NEW silica is more friable (is broken down into smaller pieces after 30 seconds and after 60 seconds of sonication) than the STANDARD silica. For example, the NEW silica had a 50% volume particle diameter of 24.90 um at 0 seconds sonication, 5.17 um at 30 seconds and 0.49 um at 60 seconds. Hence, at 30 seconds sonication there was over a 50% reduction in size (diameter) and at 60 seconds there was over a 75% reduction in size (diameter) of the 50% volume silica particles. Hence, one possibly preferred definition of "high friability" may be at least a 50% reduction in average size (diameter) at 30 seconds of sonication and at least a 75% reduction in average size (diameter) at 60 seconds of sonication of the silica particles (or in processing of the resin silica mix to form the membrane). In at least certain embodiments, it may be preferred to use a more friable silica, and may be even more preferred to use a silica that is friable and multi-modal, such as bi-modal or tri-modal, in its friability. With reference to FIG. 5, the STANDARD silica appears single modal in it friability or particle size distribution, while the NEW silica appears more friable, and bi-modal (two peaks) at 30 seconds sonication and tri-modal (three peaks) at 60 seconds sonication. Such friable and multi-modal particle size silica or silicas may provide enhanced membrane and separator properties.

The use of a filler having one or more of the above characteristics enables the production of a separator having a higher final porosity. The separators disclosed herein can have a final porosity greater than 60%, 61%, 62%, 63%, 64%, 65%, 66%, 67%, 68%, 69%, or 70%. Porosity may be measured using gas adsorption methods. Porosity can be measured by BS-TE-2060.

In some select embodiments, the porous separator can have a greater proportion of larger pores while maintaining the average pore size no greater than about 1 μm, 0.9 μm, 0.8 μm, 0.7 μm, 0.6 μm, 0.5 μm, or 0.1 μm.

In accordance with at least one embodiment, the separator is made up of polyethylene, such as an ultrahigh molecular weight polyethylene ("UHMWPE"), mixed with a processing oil and filler as well as any desired additive. In accordance with at least one other embodiment, the separator is made up of an ultrahigh molecular weight polyethylene (UHMWPE) mixed with a processing oil and talc. In accordance with at least one other embodiment, the separator is made up of UHMWPE mixed with a processing oil and silica, for instance, precipitated silica, for instance, amorphous precipitated silica. The additive can then be applied to the separator via one or more of the techniques described above.

Besides reducing electrical resistance and increasing cold cranking amps, preferred separators are also designed to bring other benefits. With regard to assembly, the separators are more easily passed through processing equipment, and therefore more efficiently manufactured. To prevent shorts during high speed assembly and later in life, the separators have superior puncture strength and oxidation resistance when compared to standard PE separators. Combined with reduced electrical resistance and increased cold cranking amps, battery manufacturers are likely to find improved and sustained electrical performance in their batteries with these new separators.

Additives/Surfactants

In certain embodiments, exemplary separators may contain one or more performance enhancing additives added to the separator or porous membrane. The performance enhancing additive may be surfactants, wetting agents, colorants, antistatic additives, an antimony suppressing additive, UV-protection additives, antioxidants, and/or the like, and any combination thereof. In certain embodiments, the additive surfactants may be ionic, cationic, anionic, or non-ionic surfactants.

In certain embodiments described herein, a reduced amount of anionic or non-ionic surfactant is added to the inventive porous membrane or separator. Because of the lower amount of surfactant, a desirable feature may include lowered total organic carbons ("TOCs") and/or lowered volatile organic compounds ("VOCs").

Certain suitable surfactants are non-ionic while other suitable surfactants are anionic. The additive may be a single surfactant or a mixture of two or more surfactants, for instance two or more anionic surfactants, two or more non-ionic surfactants, or at least one ionic surfactant and at least one non-ionic surfactant. Certain suitable surfactants may have HLB values less than 6, preferably less than 3. The use of these certain suitable surfactants in conjunction with the inventive separators described herein can lead to even further improved separators that, when used in a lead acid battery, lead to reduced water loss, reduced antimony poisoning, improved cycling, reduced float current, reduced float potential, and/or the like, or any combination thereof for that lead acid batteries. Suitable surfactants include surfactants such as salts of alkyl sulfates; alkylarylsulfonate salts; alkylphenol-alkylene oxide addition products; soaps; alkyl-naphthalene-sulfonate salts; one or more sulfo-succinates, such as an anionic sulfo-succinate; dialkyl esters of sulfo-succinate salts; amino compounds (primary, secondary, tertiary amines, or quaternary amines); block copolymers of ethylene oxide and propylene oxide; various polyethylene oxides; and salts of mono and dialkyl phosphate esters. The additive can include a non-ionic surfactant such as polyol fatty acid esters, polyethoxylated esters, polyethoxylated alcohols, alkyl polysaccharides such as alkyl polyglycosides and blends thereof, amine ethoxylates, sorbitan fatty acid ester ethoxylates, organosilicone based surfactants, ethylene vinyl acetate terpolymers, ethoxylated alkyl aryl phosphate esters and sucrose esters of fatty acids.

In certain exemplary embodiments, TOC levels may be measured in mg per kg of finished separator. For instance, such TOC levels may be measured by using a potassium persulfate solution react with carbon in an ultra-violet ("UV") detection chamber. Such TOC levels are preferably in the range of approximately 2,000 mg/kg or less, and more preferably in the range of approximately 1,500 mg/kg or less, or even approximately 1,000 mg/kg or less.

In certain exemplary embodiments, the performance additive may be a wetting agent. The amount of wetting agent may be found by the following procedure.

Cut 8 pieces 120 mm×120 mm spaced evenly across the sample width. Dry the samples for at least 5 minutes in 105° C.-110° C. (220° F.-230° F.) circulating air oven, remove from oven and weigh the sample quickly, to prevent moisture pickup ($X_1$ in g=with oil).

Place the sample pieces—folding them loosely—into the Soxhlet extraction apparatus (or Soxtherm) and extract for at least 60 minutes in vigorously boiling hexane. Remove the sample pieces from the extractor and air-dry them for 5 minutes under a well ventilated hood. Dry the samples for at least 5 minutes in 105° C.-110° C. (220° F.-230° F.) circulating air oven, remove from oven and weigh the sample quickly, to prevent moisture pickup ($X_2$ in g=without oil).

Place the hexane extracted samples again into the Soxhlet extractor (or Soxtherm) and extract for at least 60-90 min in vigorously boiling isopropanol. Decant isopropanol from the Soxhlet fully into round bottom flask(s).

Evaporate the isopropanol, under reduced pressure to speed up evaporation. After complete removal of isopropanol, place the flask(s) for 10 minutes into a 105° C. oven to remove last traces of moisture. After cooling, transfer the residue into a 25 ml volumetric flask by dissolving it in and rinsing with several 5 ml portions of chloroform (resp. $CCl_4$). Dilute the final solution in the volumetric flask with chloroform to 25 ml mark.

Fill a matched set of cells, one with sample solution, one with pure chloroform (resp. $CCl_4$) for the background spectrum and run a scan over the range 4000-600 cm$^{-1}$, according to instructions for the particular IR spectrophotometer in use.

If the obtained spectrum shows no abnormalities, the absorption band at 1051 cm$^{-1}$ is used for the calculation of the wetting agent amount in g (=$X_3$) in the sample solution by automatic calculation performed by the computerized spectrophotometer.

$X_3/X_1$*100=% of wetting agent (by weight) in sample with oil $X_3/X_2$*100=% of wetting agent (by weight) in oil-free sample Particular embodiments may have a wetting agent content of approximately 0.60% or less. In certain embodiments, the additive may be represented by a compound of Formula (I)

$$R(OR^1)_n(COOM_{1/x}^{x+})_m \qquad (I)$$

in which:

R is a linear or non-aromatic hydrocarbon radical with 10 to 4200 carbon atoms, preferably 13 to 4200, which may be interrupted by oxygen atoms;

$R^1$=H, —$(CH_2)_k COOM_{1/x}^{x+}$, or —$(CH_2)_k$—$SO_3M_{1/x}^{x+}$, preferably H, where k=1 or 2;

M is an alkali metal or alkaline-earth metal ion, $H^+$ or $NH_4^+$, where not all the variables M simultaneously have the meaning $H^+$;

n=0 or 1;

m=0 or an integer from 10 to 1400; and x=1 or 2.

The ratio of oxygen atoms to carbon atoms in the compound according to Formula (I) being in the range from 1:1.5 to 1:30 and m and n not being able to simultaneously be 0. However, preferably only one of the variables n and m is different from 0.

By non-aromatic hydrocarbon radicals is meant radicals which contain no aromatic groups or which themselves represent one. The hydrocarbon radicals may be interrupted by oxygen atoms (i.e., contain one or more ether groups).

R is preferably a straight-chain or branched aliphatic hydrocarbon radical which may be interrupted by oxygen atoms. Saturated, uncross-linked hydrocarbon radicals are quite particularly preferred. However, as noted above, R may, in certain embodiments, be aromatic ring-containing.

Through the use of the compounds of Formula (I) for the production of battery separators, they may be effectively protected against oxidative destruction.

Battery separators are preferred which contain a compound according to Formula (I) in which:

R is a hydrocarbon radical with 10 to 180, preferably 12 to 75 and quite particularly preferably 14 to 40 carbon atoms, which may be interrupted by 1 to 60, preferably 1 to 20 and quite particularly preferably 1 to 8 oxygen atoms, particularly preferably a hydrocarbon radical of formula $R^2$—$[(OC_2H_4)_p(OC_3H_6)_q]$—, in which:

$R^2$ is an alkyl radical with 10 to 30 carbon atoms, preferably 12 to 25, particularly preferably 14 to 20 carbon atoms, wherein $R^2$ can be linear or non-linear such as containing an aromatic ring;

P is an integer from 0 to 30, preferably 0 to 10, particularly preferably 0 to 4; and q is an integer from 0 to 30, preferably 0 to 10, particularly preferably 0 to 4;

compounds being particularly preferred in which the sum of p and q is 0 to 10, in particular 0 to 4;

n=1; and m=0.

Formula $R^2$—$[(OC_2H_4)_p(OC_3H_6)_q]$— is to be understood as also including those compounds in which the sequence of the groups in square brackets differs from that shown. For example according to the invention compounds are suitable in which the radical in brackets is formed by alternating $(OC_2H_4)$ and $(OC_3H_6)$ groups.

Additives in which $R^2$ is a straight-chain or branched alkyl radical with 10 to 20, preferably 14 to 18 carbon atoms have proved to be particularly advantageous. $OC_2H_4$ preferably stands for $OCH_2CH_2$, $OC_3H_6$ for $OCH(CH_3)_2$ and/or $OCH_2CH_2CH_3$.

As preferred additives there may be mentioned in particular alcohols (p=q=0; m=a) primary alcohols being particularly preferred, fatty alcohol ethoxylates (p=1 to 4, q=0), fatty alcohol propoxylates (p=0; q=1 to 4) and fatty alcohol alkoxylates (p=1 to 2; q=1 to 4) ethoxylates of primary alcohols being preferred. The fatty alcohol alkoxylates are for example accessible through reaction of the corresponding alcohols with ethylene oxide or propylene oxide.

Additives of the type m=0 which are not, or only difficulty, soluble in water and sulphuric acid have proved to be particularly advantageous.

Also preferred are additives which contain a compound according to Formula (I), in which:

R is an alkane radical with 20 to 4200, preferably 50 to 750 and quite particularly preferably 80 to 225 carbon atoms;

M is an alkali metal or alkaline-earth metal ion, $H^+$ or $NH_4^+$, in particular an alkali metal ion such as $Li^+$, $Na^+$ and $K^+$ or $H^+$, where not all the variables M simultaneously have the meaning H+;

n=0;

m is an integer from 10 to 1400; and x=1 or 2.

Salt Additives

In certain embodiments, suitable additives may include, in particular, polyacrylic acids, polymethacrylic acids and acrylic acid-methacrylic acid copolymers, whose acid groups are at least partly neutralized, such as by preferably 40%, and particularly preferably by 80%. The percentage refers to the number of acid groups. Quite particularly preferred are poly(meth)acrylic acids which are present entirely in the salt form. Suitable salts include Li, Na, K, Rb, Be, Mg, Ca, Sr, Zn, and ammonium ($NR_4$, wherein R is either hydrogen or a carbon functional group). Poly(meth)acrylic acids may include polyacrylic acids, polymethacrylic acids, and acrylic acid-methacrylic acid copolymers. Poly(meth)acrylic acids are preferred and in particular polyacrylic acids with an average molar mass $M_w$ of 1,000 to 100,000 g/mol, particularly preferably 1,000 to 15,000 g/mol and quite particularly preferably 1,000 to 4,000 g/mol. The molecular weight of the poly(meth)acrylic acid polymers and copolymers is ascertained by measuring the viscosity of a 1% aqueous solution, neutralized with sodium hydroxide solution, of the polymer (Fikentscher's constant).

Also suitable are copolymers of (meth)acrylic acid, in particular copolymers which, besides (meth)acrylic acid contain ethylene, maleic acid, methyl acrylate, ethyl acrylate, butyl acrylate and/or ethylhexyl acrylate as comonomer. Copolymers are preferred which contain at least 40% by weight and preferably at least 80% by weight (meth)acrylic acid monomer; the percentages being based on the acid form of the monomers or polymers.

To neutralize the polyacrylic acid polymers and copolymers, alkali metal and alkaline-earth metal hydroxides such as potassium hydroxide and in particular sodium hydroxide are particularly suitable. In addition, a coating and/or additive to enhance the separator may include, for example, a metal alkoxide, wherein the metal may be, by way of example only (not intended to be limiting), Zn, Na, or Al, by way of example only, sodium ethoxide.

In some embodiments, the porous polyolefin porous membrane may include a coating on one or both sides of such layer. Such a coating may include a surfactant or other material. In some embodiments, the coating may include one or more materials described, for example, in U.S. Patent Publication No. 2012/0094183, which is incorporated by reference herein. Such a coating may, for example, reduce the overcharge voltage of the battery system, thereby extending battery life with less grid corrosion and preventing dry out and/or water loss.

Ratios

In certain select embodiments, the membrane may be prepared by combining, by weight, about 5-15% polymer, in some instances, about 10% polymer (e.g., polyethylene), about 10-75% filler (e.g., silica), in some instances, about 30% filler, and about 10-85% processing oil, in some instances, about 60% processing oil. In other embodiments, the filler content is reduced, and the oil content is higher, for instance, greater than about 61%, 62%, 63%, 64%, 65%, 66%, 67%, 68%, 69% or 70% by weight. The filler:polymer ratio (by weight) may be about (or may be between about these specific ranges) such as 2:1, 2.5:1, 3:1, 3.5:1, 4.0:1. 4.5:1, 5.0:1, 5.5:1 or 6:1. The filler:polymer ratio (by weight) may be from about 1.5:1 to about 6:1, in some instances, 2:1 to 6:1, from about 2:1 to 5:1, from about 2:1 to 4:1, and in some instances, from about 2:1 to about 3:1. The amounts of the filler, the oil, and polymer are all balanced for runnability and desirable separator properties, such as electrical resistance, basis weight, puncture resistance, bending stiffness, oxidation resistance, porosity, physical strength, tortuosity, and the like.

In accordance with at least one embodiment, the porous membrane can include an UHMWPE mixed with a processing oil and precipitated silica. In accordance with at least one embodiment, the porous membrane can include an UHMWPE mixed with a processing oil, additive and precipitated silica. The mixture may also include minor amounts of other additives or agents as is common in the separator arts (e.g., surfactants, wetting agents, colorants, antistatic additives, antioxidants, and/or the like, and any combination thereof). In certain instances, the porous polymer layer may be a homogeneous mixture of 8 to 100% by volume of polyolefin, 0 to 40% by volume of a plasticizer and 0 to 92% by volume of inert filler material. The preferred plasticizer is petroleum oil. Since the plasticizer is the component which is easiest to remove, by solvent extraction and drying, from the polymer-filler-plasticizer composition, it is useful in imparting porosity to the battery separator.

In certain embodiments, the porous membrane disclosed herein may contain latex and/or rubber, which may be a natural rubber, synthetic rubber, or a mixture thereof. Natural rubbers may include one or more blends of polyisoprenes, which are commercially available from a variety of suppliers. Exemplary synthetic rubbers include methyl rubber, polybutadiene, chloropene rubbers, butyl rubber, bromobutyl rubber, polyurethane rubber, epichlorhydrin rubber, polysulphide rubber, chlorosulphonyl polyethylene, polynorbornene rubber, acrylate rubber, fluorine rubber and silicone rubber and copolymer rubbers, such as styrene/butadiene rubbers, acrylonitrile/butadiene rubbers, ethylene/propylene rubbers (EPM and EPDM) and ethylene/vinyl acetate rubbers. The rubber may be a cross-linked rubber or an uncross-linked rubber; in certain preferred embodiments, the rubber is uncross-linked rubber. In certain embodiments, the rubber may be a blend of cross-linked and uncross-linked rubber. The rubber may be present in the separator in an amount that is at least about 1%, 2%, 3%, 4%, 5%, 6%, 7%, 8%, 9%, or 10% by weight relative to the final separator weight (the weight of the polyolefin separator sheet or layer containing rubber and/or latex). In certain embodiments, the rubber may be present in an amount from approximately 1-6%, approximately 3-6% by weight, approximately 3% by weight, and approximately 6% by weight. The porous membrane may have a filler to polymer and rubber (filler:polymer and rubber) weight ratio of approximately 2.6:1.0. The amounts of the rubber, filler, oil, and polymer are all balanced for runnability and desirable separator properties, such as electrical resistance, basis weight, puncture resistance, bending stiffness, oxidation resistance, porosity, physical strength, tortuosity, and the like.

A porous membrane made in accordance with the present invention, comprising polyethylene and filler (e.g., silica) typically has a residual oil content; in some embodiments, such residual oil content is from about 0.5% up to about 40% of the total weight of the separator membrane (in some instances, about 10-40% of the total weight of the separator membrane, and in some instances, about 20-40% of that total weight). In certain select embodiments herein, some to all of the residual oil content in the separator may be replaced by the addition of more of a performance enhancing additive, such as a surfactant, such as a surfactant with a hydrophilic-lipophilic balance ("HLB") less than 6, or such as a nonionic surfactant. For example, a performance enhancing additive such as a surfactant, such as a nonionic surfactant, may comprise up to 0.5% all the way up to all of the amount of the residual oil content (e.g., all the way up to 20% or 30% or even 40%) of the total weight of the porous separator membrane, thereby partially or completely replacing the residual oil in the separator membrane.

Conductive Layer

A conductive layer may be disposed on an exemplary battery separator 100. The conductive layer may preferably be adapted to be in contact with a positive electrode of battery (not shown). The conductive layer may be for providing a new route of current to and from positive electrode (not shown). the conductive layer may be made of any conductive material, including, but not limited to, lead, gold, antimony, arsenic, zinc, barium, beryllium, lithium, magnesium, nickel, aluminum, silver, tin, and combination alloys thereof, or carbon fibers, graphite, carbon nanotubes, Buckminsterfullerene (or bucky-balls), and combinations thereof. The carbon nanotubes or bucky-balls might be dispersed in a medium with a binder and painted on battery separator. The conductive layer may be made of any conductive material that is more corrosion resistant than the positive electrode conductor, therefore allowing the conductive layer to function as the positive electrode conductor when the conductive capability of the positive electrode conductor deteriorates. The conductive layer may be a lead based alloy with 0.8% to 1.17% tin, and greater than zero (0) to 0.015% silver. The conductive layer may be a lead-based alloy with 0.02% to 0.06% calcium, 0.3% to 3% tin, and 0.01% to 0.05% silver. The conductive layer may be made into any form, including but not limited to, a strip, a screen, a foil, a thread, a wire, a coating, etc., or combinations thereof. The conductive layer may be any thickness, for example, a thickness of approximately 3 µm. The conductive layer may be disposed upon the battery separator by any means, including, but not limited to, adhesives, hot melting, painting, etc. The conductive layer may be as described in U.S. Pat. No. 9,564,623, which is incorporated herein by reference in its entirety.

Nucleation Additives

In certain embodiments, a separator may contain a performance-enhancing additive in the form of a nucleation additive and/or coating. The nucleation additive may preferably be stable in the battery electrolyte, and may further be dispersed within the electrolyte.

Exemplary forms of nucleation additives and/or coatings may be or contain carbon, such as carbon, conductive carbon, graphite, artificial graphite, activated carbon, carbon paper, acetylene black, carbon black, high surface area carbon black, graphene, high surface area graphene, keitjen black, carbon fibers, carbon filaments, carbon nanotubes, open-cell carbon foam, a carbon mat, carbon felt, carbon Buckminsterfullerene (Bucky Balls), an aqueous carbon suspension, and combinations thereof. In addition to these many forms of carbon, the nucleation additive and/or coating may also include or contain barium sulfate ($BaSO_4$) either alone or in combination with carbon.

The nucleation coating may be applied to a finished separator by such means as a slurry coating, slot die coating, spray coating, curtain coating, ink jet printing, screen printing, or by vacuum deposition or chemical vapor deposition ("CVD"). In addition, the additive and/or coating may be provided as carbon paper, either woven or nonwoven, and disposed between and in intimate contact with the separator and electrode(s).

The nucleation additive and/or coating may be within the separator, or on one or both electrode facing surfaces of the separator. Typically, a coating or layer of the nucleation additive may only be on the negative electrode facing surface. However, it may be on the positive electrode facing surface, or on both surfaces.

In certain embodiments, the nucleation additive may be added to the extrusion mix of base materials and extruded with the separator, or co-extruded as a layer on the separator. When included in the extrusion mix, the nucleation additive may replace some of the silica filler by as much as 5% to 75% by weight. For example, the nucleation additive may be approximately 5%, 10%, 15%, 20%, 25%, 30%, 35%, 40%, 45%, 50%, 55%, 60%, 65%, 70%, or approximately 75% by weight. In other exemplary embodiments, the nucleation additive may be no greater than approximately 75%, 70%, 65%, 60%, 55%, 50%, 45%, 40%, 35%, 30%, 25%, 20%, 15%, 10%, or approximately 5% weight.

Manufacture

In some embodiments, an exemplary porous membrane may be made by mixing the constituent parts in an extruder. For example, about 30% by weight filler with about 10% by weight UHMWPE, and about 60% processing oil may be mixed in an extruder. The exemplary porous membrane may be made by passing the constituent parts through a heated extruder, passing the extrudate generated by the extruder through a die and into a nip formed by two heated presses or calender stack or rolls to form a continuous web. A substantial amount of the processing oil from the web may be extracted by use of a solvent, thereby followed with removing the solvent by drying. The web may then be cut into lanes of predetermined width, and then wound onto rolls. Additionally, the presses or calender rolls may be engraved with various groove patterns to impart ribs, grooves, textured areas, embossments, and/or the like as substantially described herein.

Manufacture with Rubber

In some embodiments, an exemplary porous membrane may be made by mixing the constituent parts in an extruder. For example, about 5-15% by weight polymer (e.g., polyethylene), about 10-75% by weight filler (e.g., silica), about 1-50% by weight rubber and/or latex, and about 10-85% processing oil may be mixed in an extruder. The exemplary porous membrane may be made by passing the constituent parts through a heated extruder, passing the extrudate generated by the extruder through a die and into a nip formed by two heated presses or calender stack or rolls to form a continuous web. A substantial amount of the processing oil from the web may be extracted by use of a solvent. The web may then be dried and slit into lanes of predetermined width, and then wound onto rolls. Additionally, the presses or calender rolls may be engraved with various groove patterns to impart ribs, grooves, textured areas, embossments, and/or the like as substantially described herein. The amounts of the rubber, filler, oil, and polymer are all balanced for runnability and desirable separator properties, such as electrical resistance, basis weight, puncture resistance, bending stiffness, oxidation resistance, porosity, physical strength, tortuosity, and the like.

In addition to being added to the constituent parts of the extruder, certain embodiments combine the rubber to the porous membrane after extrusion. For example, the rubber may be coated onto one or both sides, preferably on the side facing the negative electrode, with a liquid slurry comprising the rubber and/or latex, optionally, silica, and water, and then dried such that a film of this material is formed upon the surface of an exemplary porous membrane. For better wettability of this layer, known wetting agents may be added to the slurry for use in lead acid batteries. In certain embodiments, the slurry can also contain one or more performance enhancing additives as described herein. After drying, a porous layer and/or film forms on the surface of the separator, which adheres very well to the porous membrane and increases electrical resistance only insignificantly, if at all. After the rubber is added, it may be further compressed using either a machine press or calender stack or roll. Other possible methods to apply the rubber and/or latex are to apply a rubber and/or latex slurry by dip coat, roller coat, spray coat, or curtain coat one or more surfaces of the separator, or any combination thereof. These processes may occur before or after the processing oil has been extracted, or before or after it is slit into lanes.

A further embodiment of the present invention involves depositing rubber onto the membrane by impregnation and drying.

Manufacture with Performance Enhancing Additives

In certain embodiments, performance enhancing additives or agents (e.g., surfactants, wetting agents, colorants, antistatic additives, antioxidants, and/or the like, and any combination thereof) may also be mixed together with the other constituent parts within the extruder. A porous membrane according to the present disclosure may then be extruded into the shape of a sheet or web, and finished in substantially the same way as described above.

In certain embodiments, and in addition or alternative to adding into the extruder, the additive or additives may, for example, be applied to the separator porous membrane when it is finished (e.g., after extracting a bulk of the processing oil, and before or after the introduction of the rubber). According to certain preferred embodiments, the additive or a solution (e.g., an aqueous solution) of the additive is applied to one or more surfaces of the separator. This variant is suitable in particular for the application of non-thermostable additives and additives which are soluble in the solvent used for the extraction of processing oil. Particularly suitable as solvents for the additives according to the invention are low-molecular-weight alcohols, such as methanol and ethanol, as well as mixtures of these alcohols with water. The application can take place on the side facing the negative electrode, the side facing the positive electrode, or on both sides of the separator. The application may also take place during the extraction of the pore forming agent (e.g., the processing oil) while in a solvent bath. In certain select embodiments, some portion of a performance enhancing additive, such as a surfactant coating or a performance enhancing additive added to the extruder before the separator is made (or both) may combine with the antimony in the battery system and may inactivate it and/or form a compound with it and/or cause it to drop down into the mud rest of the battery and/or prevent it from depositing onto the negative electrode. The surfactant or additive may also be added to the electrolyte, the glass mat, the battery case, pasting paper, pasting mat, and/or the like, or combinations thereof.

In certain embodiments, the additive (e.g., a non-ionic surfactant, an anionic surfactant, or mixtures thereof) may be present at a density or add-on level of at least 0.5 g/m$^2$, 1.0 g/m$^2$, 1.5 g/m$^2$, 2.0 g/m$^2$, 2.5 g/m$^2$, 3.0 g/m$^2$, 3.5 g/m$^2$, 4.0 g/m$^2$, 4.5 g/m$^2$, 5.0 g/m$^2$, 5.5 g/m$^2$, 6.0 g/m$^2$, 6.5 g/m$^2$, 7.0 g/m$^2$, 7.5 g/m$^2$, 8.0 g/m$^2$, 8.5 g/m$^2$, 9.0 g/m$^2$, 9.5 g/m$^2$ or 10.0 g/m$^2$ or even up to about 25.0 g/m$^2$. The additive may be present on the separator at a density or add-on level between 0.5-15 g/m$^2$, 0.5-10 g/m$^2$, 1.0-10.0 g/m$^2$, 1.5-10.0 g/m$^2$, 2.0-10.0 g/m$^2$, 2.5-10.0 g/m$^2$, 3.0-10.0 g/m$^2$, 3.5-10.0 g/m$^2$, 4.0-10.0 g/m$^2$, 4.5-10.0 g/m$^2$, 5.0-10.0 g/m$^2$, 5.5-10.0 g/m$^2$, 6.0-10.0 g/m$^2$, 6.5-10.0 g/m$^2$, 7.0-10.0 g/m$^2$, 7.5-10.0 g/m$^2$, 4.5-7.5 g/m$^2$, 5.0-10.5 g/m$^2$, 5.0-11.0 g/m$^2$, 5.0-12.0 g/m$^2$, 5.0-15.0 g/m$^2$, 5.0-16.0 g/m$^2$, 5.0-17.0 g/m$^2$, 5.0-18.0 g/m$^2$, 5.0-19.0 g/m$^2$, 5.0-20.0 g/m$^2$, 5.0-21.0 g/m$^2$, 5.0-22.0 g/m$^2$, 5.0-23.0 g/m$^2$, 5.0-24.0 g/m$^2$, or 5.0-25.0 g/m$^2$.

The application may also take place by dipping the battery separator in the additive or a solution of the additive (solvent bath addition) and removing the solvent if necessary (e.g., by drying). In this way the application of the additive may be combined, for example, with the extraction often applied during membrane production. Other preferred methods are to spray the surface with additive, dip coat, roller coat, or curtain coat the one or more additives on the surface of separator.

In certain embodiments described herein, a reduced amount of ionic, cationic, anionic, or non-ionic surfactant is added to the inventive separator. In such instances, a desirable feature may include lowered total organic carbons and/or lowered volatile organic compounds (because of the lower amount of surfactant) may produce a desirable inventive separator according to such embodiment.

Combined with a Fibrous Mat

In certain embodiments, exemplary separators according to the present disclosure may be combined with another layer (laminated or otherwise), such as a fibrous layer or fibrous mat having enhanced wicking properties and/or enhanced wetting or holding of electrolyte properties. The fibrous mat may be woven, nonwoven, fleeces, mesh, net, single layered, multi-layered (where each layer may have the same, similar or different characteristics than the other layers), composed of glass fibers, or synthetic fibers, fleeces or fabrics made from synthetic fibers or mixtures with glass and synthetic fibers or paper, or any combination thereof.

In certain embodiments, the fibrous mat (laminated or otherwise) may be used as a carrier for additional materials. The addition material may include, for example, rubber and/or latex, optionally silica, water, and/or one or more performance enhancing additive, such as various additives described herein, or any combination thereof. By way of example, the additional material may be delivered in the form of a slurry that may then be coated onto one or more surfaces of the fibrous mat to form a film, or soaked and impregnated into the fibrous mat.

When the fibrous layer is present, it is preferred that the porous membrane has a larger surface area than the fibrous layers. Thus, when combining the porous membrane and the fibrous layers, the fibrous layers do not completely cover the porous layer. It is preferred that at least two opposing edge regions of the membrane layer remain uncovered to provide edges for heat sealing which facilitates the optional formation of pockets or envelopes and/or the like. Such a fibrous mat may have a thickness that is at least 100 μm, in some embodiments, at least about 200 μm, at least about 250 μm, at least about 300 μm, at least about 400 μm, at least about 500 μm, at least about 600 μm, at least about 700 μm, at least about 800 μm, at least about 900 μm, at least about 1 mm, at least about 2 mm, and so forth. The subsequent laminated separator may be cut into pieces. In certain embodiments, the fibrous mat is laminated to a ribbed surface of the porous membrane porous membrane. In certain embodiments, handling and/or assembly advantages are provided to the battery maker with the improved separator described herein, as it may be supplied in roll form and/or cut piece form. And as mentioned previously, the improved separator may be a standalone separator sheet or layer without the addition of one or more fibrous mats or the like.

If the fibrous mat is laminated to the porous membrane, they may be bonded together by adhesive, heat, ultrasonic welding, compression, and/or the like, or any combination thereof. And, the fibrous mat may be a PAM or NAM retention mat.

Basis Weight

In certain select embodiments, exemplary separators may be characterized with a basis weight (also referred to as area weight) measured in units of g/m$^2$. Exemplary separators may exhibit a decreased basis weight. For instance, exemplary separators may have a basis weight of approximately 90 g/m$^2$ to approximately 140 g/m$^2$. In certain select embodiments, the basis weight may be approximately 90 g/m$^2$, 100 g/m$^2$, 110 g/m$^2$, 120 g/m$^2$, 130 g/m$^2$, or 140 g/m$^2$. In other embodiments, the basis weight may be no greater than or equal to 140 g/m$^2$, 130 g/m$^2$, 120 g/m$^2$, 110 g/m$^2$, 100 g/m$^2$, 90 g/m$^2$, or lower. Exemplary separators preferably have a basis weight of approximately 90 g/m$^2$ to approximately 130 g/m$^2$ or lower, and preferably approximately 90 g/m$^2$ to approximately 120 g/m$^2$ or lower.

The basis weight is measured simply by weighing a sample, then dividing that value by the area of that sample. For example, one would take a 1.0 m by 1.0 m sample and weigh it. The area is calculated without regard to any ribs, groves, embossments, etc. As an example, a 1.0 m by 1.0 m sample of a ribbed separator would have the same area as a 1.0 m by 1.0 m sample of a flat separator.

Electrical Resistance

In certain select embodiments, the disclosed separators exhibit decreased electrical resistance. For instance, an exemplary separator may have an electrical resistance ("ER") from approximately 20 mΩ·cm$^2$ to approximately 200 mΩ·cm$^2$. In certain select embodiments, the separator may have an ER of approximately, 20 mΩ·cm$^2$, 30 mΩ·cm$^2$, 40 mΩ·cm$^2$, 50 mΩ·cm$^2$, 60 mΩ·cm$^2$, 80 mΩ·cm$^2$, 100 mΩ·cm$^2$, 120 mΩ·cm$^2$, 140 mΩ·cm$^2$, 160 mΩ·cm$^2$, 180 mΩ·cm$^2$, or 200 mΩ·cm$^2$. In other select embodiments, the ER may be no greater than or equal to about 200 mΩ·cm$^2$, 180 mΩ·cm$^2$, 160 mΩ·cm$^2$, 140 mΩ·cm$^2$, 120 mΩ·cm$^2$, 100 mΩ·cm$^2$, 80 mΩ·cm$^2$, 60 mΩ·cm$^2$, 50 mΩ·cm$^2$, 40 mΩ·cm$^2$, 30 mΩ·cm$^2$, or 20 mΩ·cm$^2$. However, it is possible for the ER to be even lower than 20 mΩ·cm$^2$. In various embodiments, the separators described herein exhibit about a 20% or more reduction in ER compared with a known separator of the same thickness. For example, a known separator may have an ER value of 60 mΩcm$^2$; thus, a separator according to the present invention at the same thickness would have an ER value of less than about 48 mΩ·cm$^2$.

To test a sample separator for ER testing evaluation in accordance with the present invention, it must first be prepared. To do so, a sample separator is preferably submerged in a bath of demineralized water, the water is then brought to a boil and the separator is then removed after 10 minutes in the boiling demineralized water bath. After removal, excess water is shaken off the separator and then placed in a bath of sulfuric acid having a specific gravity of 1.280 at 27° C.±1° C. The separator is soaked in the sulfuric acid bath for 20 minutes. The separator is then ready to be tested for electrical resistance.

Oxidation Stability

In certain select embodiments, exemplary separators may be characterized with an improved and higher oxidation resistance. Oxidation resistance is measured in elongation of sample separator specimens in the cross-machine direction after prolonged exposure to the lead acid battery electrolyte. For instance, exemplary separators may have an elongation at 40 hours of approximately 150% or higher, 200% or higher, 250% or higher, 300% or higher, 350% or higher, 400% or higher, 450% or higher, or 500% or higher. In certain embodiments, exemplary separators may have a preferred oxidation resistance or elongation at 40 hours of approximately 200% or higher.

Figure 6A:
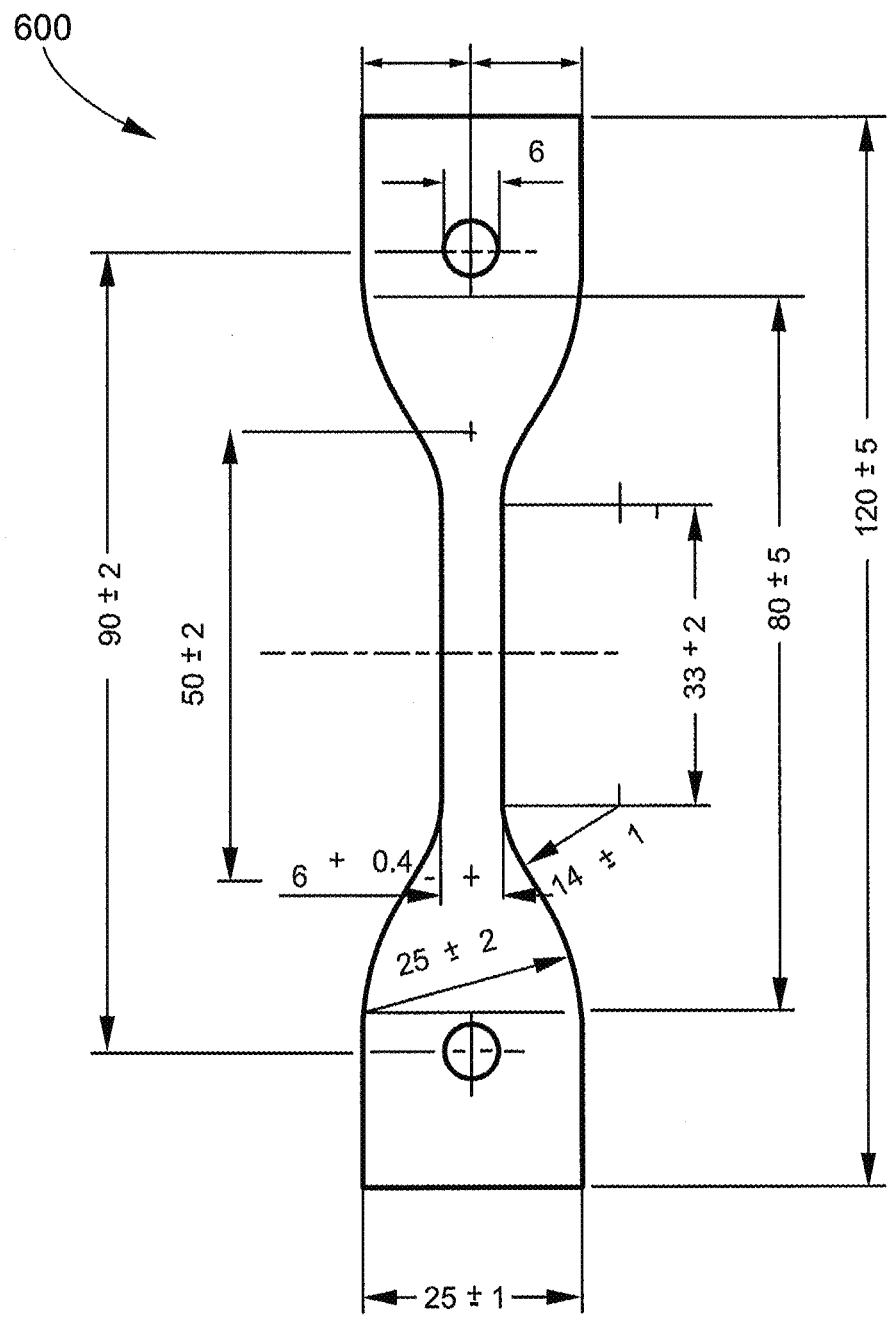
FIG. 6A is a schematic rendering of an elongation test sample.
Figure 6B:
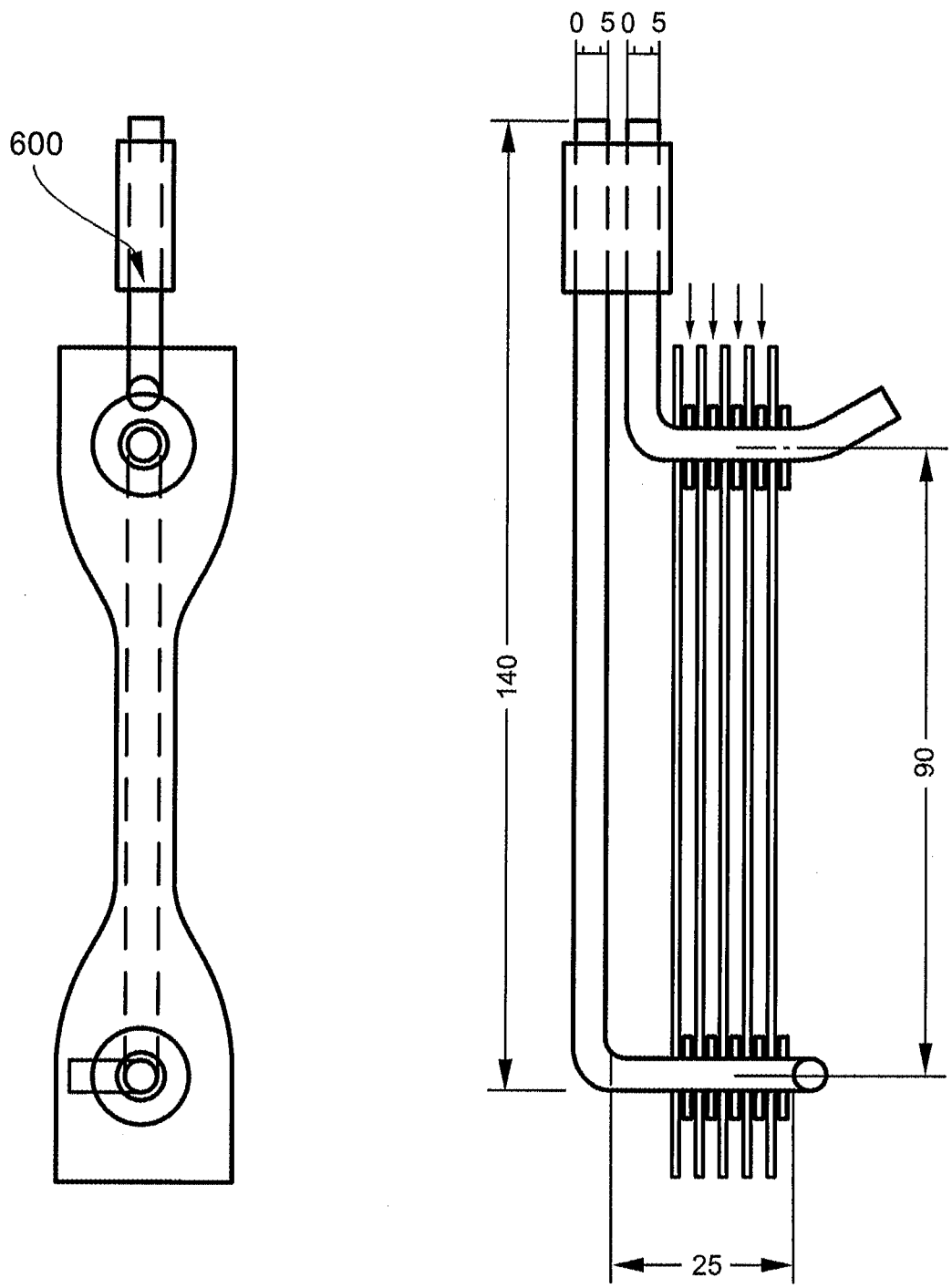
FIG. 6B illustrates a sample holder for an elongation test.

To test samples for oxidation resistance, sample specimens 400 of exemplary separators are first cut to a shape as generally set forth in FIG. 6A. The specimens 400 are then placed in a sample holder as generally shown in FIG. 6B.

A first sample set is tested dry, at time=zero (0) hours, for elongation % to break. The elongation is based upon the 50 mm distance as measured from points A and B in FIG. 6A. For instance, if points A and B are stretched to a distance of 300%, then the final distance between A and B would be 150 mm.

The elongation test is designed to simulate extended exposure to electrolyte in a cycling battery in a shortened time period. The samples 400 are first fully submersed in isopropanol, drained and then submersed in water for 1 to 2 seconds. The samples are then submersed in an electrolyte solution. The solution is prepared by adding, in order, 360 ml of 1.28 specific gravity sulfuric acid, 35 ml of 1.84 specific gravity sulfuric acid, then 105 ml of 35% hydrogen peroxide. The solution is kept at 80° C. and the samples are submerged in the solution for an extended period. Samples may be tested for elongation at regular time intervals, such as 20 hours, 40 hours, 60 hours, 80 hours, etc. To test at these intervals, the samples 400 are remove from the 80° C. electrolyte bath and placed under luke-warm running water until the acid has been removed. The elongation can then be tested.

In accordance with at least select embodiments, the present disclosure or invention is directed to improved battery separators, Low ER or high conductance separators, improved lead acid batteries, such as flooded lead acid batteries, high conductance batteries, and/or, improved vehicles including such batteries, and/or methods of manufacture or use of such separators or batteries, and/or combinations thereof. In accordance with at least certain embodiments, the present disclosure or invention is directed to improved lead acid batteries incorporating the improved separators and which exhibit increased conductance.

CONCLUSION

In accordance with select embodiments, an improved or novel battery separator is provided with a porous membrane having a backweb with a plurality of ribs extending from at least a portion thereof. The porous membrane may have a composition of a polymer, a filler, at least one performance enhancing additive, a plasticizer, and optionally, a rubber. The separator may have an acid leachable total organic carbon ("TOC") of less than or equal to approximately 2,000 mg per kg of the battery separator as measured by a potassium persulfate solution react with carbon in an ultra-violet detection chamber, and preferably less than or equal to approximately 1,500 mg per kg of the battery separator as measured by a potassium persulfate solution react with carbon in an ultra-violet detection chamber, and more preferably less than or equal to approximately 1,000 mg per kg of the battery separator as measured by a potassium persulfate solution react with carbon in an ultra-violet detection chamber.

A refinement of select embodiments may provide at least a portion of the plurality of ribs as positive ribs extending from a positive electrode facing surface of the porous membrane, at least a portion of the plurality of ribs as negative ribs extending from a negative electrode facing surface of the porous membrane, or the embodiment may be provided with both positive and negative ribs. Either, both, or neither of the positive and negative ribs may uniformly extend from a first lateral edge to a second lateral edge. Either, both, or neither of the positive and negative ribs may also uniformly extend from at top edge to a bottom edge. Either, or both of the positive ribs and negative ribs may be designed and optimized to reduce dendrite formation and growth.

In certain exemplary separators, either sets of positive ribs and/or negative ribs may be any one of the following: solid ribs, discrete broken ribs, continuous ribs, discontinuous ribs, discontinuous peaks, discontinuous protrusions, angled ribs, diagonal ribs, linear ribs, ribs that are longitudinally extending substantially in a machine direction of said porous membrane, ribs that are laterally extending substantially in a cross-machine direction of said porous membrane, ribs that are transversely extending substantially in said cross-machine direction of the separator, discrete teeth, toothed ribs, serrations, serrated ribs, battlements, battlemented ribs, curved ribs, continuous sinusoidal ribs, discontinuous sinusoidal ribs, S-shaped ribs, continuous zig-zag-sawtooth-like ribs, broken discontinuous zig-zag-sawtooth-like ribs, grooves, channels, textured areas, embossments, dimples, columns, mini columns, porous, non-porous, cross ribs, mini ribs, cross-mini ribs, and combinations thereof.

In select exemplary separators, either sets of positive ribs and/or negative ribs may be broken ribs, wherein the ribs have discrete terminal points contained within the edges of the separator and are disconnected to any other ribs. The broken ribs may be defined by an angular orientation to enhance acid mixing in a battery, especially during movement of the battery, with the separator disposed therein and positioned parallel to a start and stop motion of the battery. The angular orientation may be defined relative to the MD of the separator and be an angle of between greater than zero degrees (0°) and less than 180 degrees (180°), or greater than 180 degrees (180°) and less than 360 degrees (360°). The angular orientation of the ribs may vary throughout the plurality of ribs. In certain select embodiments, exemplary separators may have a plurality of sets of ribs, wherein each set of ribs has a different or same angular orientation compared to the other sets of ribs. In other exemplary separators, the positive and/or negative ribs may have an angular orientation that is between zero degrees (0°) to 360 degrees (360°).

In select embodiments, the positive ribs may have a rib height of approximately 50 μm to approximately 2.0 mm. Further, at least a portion of said positive ribs may have a base width of approximately 300 μm to approximately 750 μm. In some exemplary embodiments, at least a portion of the positive ribs may have a second base width of approximately 400 μm to approximately 500 μm. Should at least a portion of the positive ribs and/or negative ribs be substantially straight and substantially parallel to one another, they may have a spacing length of approximately 50 μm to approximately 20 mm.

In certain exemplary embodiments, the negative ribs may be approximately 5.0% or less to approximately 100% or greater compared to the height of the positive ribs. For example, the battery separator may have negative ribs with a height ranging from approximately 5.0 µm to approximately 2.0 mm. Exemplary negative ribs may have a base width of approximately 5 µm to approximately 500 µm.

In select exemplary embodiments, as aspect of the present invention provides the separator or porous membrane with a composition that may include any or more of the following: a polymer, polyolefin, polyethylene, polypropylene, ultra-high molecular weight polyethylene ("UHMWPE"), phenolic resin, polyvinyl chloride ("PVC"), rubber, synthetic wood pulp ("SWP"), lignins, glass fibers, synthetic fibers, cellulosic fibers, rubber, and combinations thereof.

A refinement of the present inventions provides that the rubber may be any one or more of the following: cross-linked rubber, un-cross-linked rubber, cured rubber, uncured rubber, natural rubber, latex, synthetic rubber, and combinations thereof. Another refinement of the present invention provides that the rubber may be any one or more of the following: methyl rubber, polybutadiene, one or more chloropene rubbers, butyl rubber, bromobutyl rubber, polyurethane rubber, epichlorhydrin rubber, polysulphide rubber, chlorosulphonyl polyethylene, polynorbornene rubber, acrylate rubber, fluorine rubber, silicone rubber, copolymer rubbers, and combinations thereof. Further, the copolymer rubbers may be any one or more of the following: styrene/butadiene rubbers, acrylonitrile/butadiene rubbers, ethylene/propylene rubbers (EPM and EPDM), ethylene/vinyl acetate rubbers, and combinations thereof.

In select embodiments, the rubber may be present at an amount that is approximately 1% by weight to approximately 6% by weight, preferably approximately 3% by weight, preferably approximately 6% by weight, and more preferably 3 approximately 3% by weight to approximately 6% by weight. The rubber may be mixed with the other base materials of the separator, or coated on at least a portion of one or more surfaces of the separator or porous membrane. If coated, the rubber may be applied as a liquid slurry and dried.

Exemplary embodiments of the invention may possess a filler that may be any one or more of the following: silica, dry finely divided silica; precipitated silica; amorphous silica; alumina; talc; fish meal, fish bone meal, and combinations thereof. Further, the silica may have a molecular ratio of OH:Si groups, measured by $^{29}$Si-NMR, that may be within a range of approximately 21:100 to 35:100, approximately 23:100 to approximately 31:100, approximately 25:100 to approximately 29:100, and alternately at least approximately 27:100 or greater.

An exemplary filler of the present invention, may provide exemplary fillers with a high structural morphology. A refinement of the present invention, may provide an exemplary filler characterized by at least one or more of the following: having an average particle size of 5 µm or less; having a surface area of at least 100 m²/g; having an oil absorption rate of at least 150 ml/100 mg; and combinations thereof.

The separator or porous membrane may have a filler to polymer (filler:polymer) weight ratio of approximately 2.0:1.0 to approximately 4.0:1.0, such as, for example, approximately 2.0:1.0; alternatively approximately 2.6:1.0; and also alternatively approximately 3.5:1.0; and a filler to a combined filler and rubber by weight (filler: polymer and rubber) of approximately 2.0:1.0 to approximately 3.0:1.0, such as 2.6:1.0.

Exemplary porous membranes may have a backweb thickness of approximately 100 µm to approximately 400 µm, preferably approximately 100 µm to approximately 250 µm, preferably approximately 100 µm to approximately 200 µm, preferably approximately 100 µm to approximately 150 µm, and most preferably approximately 100 µm to approximately 100 µm, Exemplary separators according to the present disclosure may possess an overall thickness of approximately 100 µm to approximately 1.0 mm, preferably approximately 100 µm to approximately 850 µm, preferably approximately 100 µm to approximately 650 µm, preferably approximately 100 µm to approximately 450 µm, preferably approximately 100 µm to approximately 250 µm, and most preferably approximately 100 µm to approximately 150 µm.

Another aspect of the present invention may provide at least one performance enhancing additive that may be one or more of the following: surfactants, wetting agents, colorants, antistatic additives, an antimony suppressing additive, UV-protection additives, antioxidants, and combinations thereof. A refinement provides that an exemplary surfactant is one or more of the following: a non-ionic surfactant, an ionic surfactant, an anionic surfactant, a cationic surfactant, and combinations thereof. Further, exemplary performance enhancing additives may possess a lithium ion, an aluminum ion, or both.

Exemplary embodiments may provide a surfactant at an amount of at least approximately 0.5 g/m² to approximately 6 g/m², and alternatively approximately 0.5 g/m² to approximately 3 g/m². The performance enhancing additive may be, for example, coated on at least a portion of the porous membrane or separator, impregnated within at least a portion of the porous membrane or separator, or mixed with the polymer and filler prior to the extrusion of the porous membrane.

Another aspect of the present invention provides the porous membrane or separator with a processing plasticizer, which may be, for example, processing oil, petroleum oil, paraffin-based mineral oil, mineral oil, and combinations thereof. The plasticizer is typically added to a mix of the polymer, filler, and optionally the performance enhancing additive prior to the extrusion of the porous membrane. After extrusion, a portion of the plasticizer may be extracted by known means.

In some select embodiments, the separator is further provided with a fibrous mat, which may be adhered or bonded to the separator in some fashion or simply placed adjacent thereto. The mat may be composed of any one or more of the following: glass fibers, synthetic fibers, silica, at least one performance enhancing additive, latex, natural rubber, synthetic rubber, or combinations thereof. In addition, the mat may be nonwoven, woven, fleece, net, or combinations thereof.

Exemplary separators may exhibit increased performance parameters, such as a lower electrical resistance ("ER") as compared to conventional separators. For instance, the ER may be less than or equal to approximately 65 mΩ·cm², preferably less than or equal to approximately 50 mΩ·cm², and most preferably less than or equal to approximately 35 mΩ·cm², Exemplary separators may be provided with a conductive layer on one or both positive side and negative side of the separator. In addition, the separator may have an oxidation resistance at 40 hours of approximately 200% or greater. Furthermore, the separator may take a variety of shapes and/or configurations. For instance, exemplary separators may be any one of the following: a cut piece, a pocket, a sleeve, a wrap, an envelope, hybrid envelope, a S-weave separator, or comprises side folds.

Embodiments of the present invention also provide a battery utilizing a separator as substantially described herein. For example, the battery may be a lead acid battery, such as a flat-plate battery, a flooded lead acid battery, an enhanced flooded lead acid battery ("EFB"), a deep-cycle battery, a gel battery, an absorptive glass mat ("AGM") battery, a tubular battery, an inverter battery, a vehicle battery, a starting-lighting-ignition ("SLI") vehicle battery, an idling-start-stop ("ISS") vehicle battery, an automobile battery, a truck battery, a motorcycle battery, an all-terrain vehicle battery, a forklift battery, a golf cart battery, a hybrid-electric vehicle battery, an electric vehicle battery, an e-rickshaw battery, an e-bike battery, an uninterruptable power supply ("UPS") battery, or a solar or wind power or other renewable energy storage system battery. Exemplary batteries may be used in a partial state of charge with a depth of discharge of between approximately 1% to approximately 99%, and possibly from approximately 1% to approximately 50%, and additionally possible from approximately 50% to approximately 99%. The battery may be utilized while in motion, stationary, in an energy storage system application; in a renewable energy storage system application; in an uninterruptible power supply application; in an energy reserve system application, in a backup power application, in a cycling applications, and combinations thereof.

Other embodiments may include systems that utilizes a battery as substantially described herein. Such systems may include an energy storage system; renewable energy storage system; an uninterruptible power supply; an energy reserve system, a power backup system, and combinations thereof. Such systems may further include vehicles such as an automobile, a truck, a motorcycle, an all-terrain vehicle, a forklift, a golf cart, a hybrid vehicle, a hybrid-electric vehicle battery, an electric vehicle, an idling-start-stop ("ISS") vehicle, a water vessel, an e-rickshaw battery, an e-trike and an e-bike battery.

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" may be used in place of "comprising" and "including" to provide for more specific embodiments of the invention and are also disclosed. Other than in the examples, or where otherwise noted, all numbers expressing quantities of ingredients, reaction conditions, and so forth used in the specification and claims are to be understood at the very least, and not as an attempt to limit the application of the doctrine of equivalents to the scope of the claims, to be construed in light of the number of significant digits and ordinary rounding approaches.

In accordance with at least select embodiments, aspects or objects, disclosed herein or provided are novel or improved separators, battery separators, enhanced flooded battery separators, batteries, cells, and/or methods of manufacture and/or use of such separators, battery separators, enhanced flooded battery separators, cells, and/or batteries. In accordance with at least certain embodiments, the present disclosure or invention is directed to novel or improved battery separators for enhanced flooded batteries. In addition, there is disclosed herein methods, systems, and battery separators having a reduced ER, improved puncture strength, improved separator CMD stiffness, improved oxidation resistance, reduced separator thickness, reduced basis weight, and any combination thereof. In accordance with at least particular embodiments, the present disclosure or invention is directed to an improved separator for enhanced flooded batteries wherein the separator has a reduced ER, improved puncture strength, improved separator CMD stiffness, improved oxidation resistance, reduced separator thickness, reduced basis weight, or any combination thereof. In accordance with at least certain embodiments, separators are provided that include or exhibit a reduced ER, improved puncture strength, improved separator CMD stiffness, improved oxidation resistance, reduced separator thickness, reduced basis weight, and any combination thereof. In accordance with at least certain embodiments, separators are provided in battery applications for flat-plate batteries, tubular batteries, vehicle SLI, and HEV ISS applications, deep cycle applications, golf car or golf cart and e-rickshaw batteries, batteries operating in a partial state of charge ("PSOC"), inverter batteries; and storage batteries for renewable energy sources, and any combination thereof.

The present invention may be embodied in other forms without departing from the spirit and the essential attributes thereof, and, accordingly, reference should be made to the appended claims, rather than to the foregoing specification, as indicating the scope of the invention. Disclosed are components that may be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that may be performed it is understood that each of these additional steps may be performed with any specific embodiment or combination of embodiments of the disclosed methods.

The foregoing written description of structures and methods has been presented for purposes of illustration only. Examples are used to disclose exemplary embodiments, including the best mode, and also to enable any person skilled in the art to practice the invention, including making and using any devices or systems and performing any incorporated methods. These examples are not intended to be exhaustive or to limit the invention to the precise steps and/or forms disclosed, and many modifications and variations are possible in light of the above teaching. Features described herein may be combined in any combination. Steps of a method described herein may be performed in any sequence that is physically possible. The patentable scope of the invention is defined by the appended claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The compositions and methods of the appended claims are not limited in scope by the specific compositions and methods described herein, which are intended as illustrations of a few aspects of the claims. Any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

As used in the specification and the appended claims, the singular forms "a," "an," and "the" include plural referents unless the context clearly dictates otherwise. Ranges may be expressed herein as from "about" or "approximately" one particular value, and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. "Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers, or steps. The terms "consisting essentially of" and "consisting of" may be used in place of "comprising" and "including" to provide for more specific embodiments of the invention and are also disclosed. "Exemplary" or "for example" means "an example of" and is not intended to convey an indication of a preferred or ideal embodiment. Similarly, "such as" is not used in a restrictive sense, but for explanatory or exemplary purposes.

Other than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

Unless defined otherwise, all technical and scientific terms used herein have the same meanings as commonly understood by one of skill in the art to which the disclosed invention belongs. Publications cited herein and the materials for which they are cited are specifically incorporated by reference.

Additionally, the invention illustratively disclosed herein suitably may be practiced in the absence of any element which is not specifically disclosed herein.

What is claimed is:

1. A battery separator comprising:
   a porous membrane comprising: a polymer; and a filler; said porous membrane having a backweb having a negative electrode facing surface and a positive electrode facing surface with a plurality of ribs extending from the negative electrode facing surface and from the positive electrode facing surface; and
   an acid leachable total organic carbon ("TOC") of less than or equal to approximately 2,000 mg per kg of said battery separator as measured by a potassium persulfate solution react with carbon in an ultra-violet detection chamber, and wherein the plurality of ribs have a top portion with a semi-circular or triangular shape;
   wherein the plurality of ribs on the negative electrode facing surface are spaced from 50 to 200 microns;
   wherein the filler is a friable silica having a bi-modal or tri-modal particle size distribution;
   wherein said plurality of ribs comprises positive ribs and negative ribs, wherein said positive ribs extend from the positive electrode facing surface of said porous membrane;
   and wherein said negative ribs extend from the negative electrode facing surface of said porous membrane;
   wherein said negative ribs are optimized to mitigate dendrite shorts; and
   wherein said positive ribs are optimized to mitigate dendrite shorts.

2. The battery separator of claim 1 wherein said positive ribs have a top portion with a semi-circular or triangular shape.

3. The battery separator of claim 1 wherein said positive ribs extend uniformly from a first lateral side edge to a second lateral side edge of said porous membrane.

4. The battery separator of claim 1 wherein said positive ribs are one of the following group consisting of solid ribs, discrete broken ribs, continuous ribs, discontinuous ribs, discontinuous peaks, discontinuous protrusions, angled ribs, diagonal ribs, linear ribs, ribs that are longitudinally extending substantially in a machine direction of said porous membrane, ribs that are laterally extending substantially in a cross-machine direction of said porous membrane, ribs that are transversely extending substantially in said cross-machine direction of the separator, discrete teeth, toothed ribs, serrations, serrated ribs, battlements, battlemented ribs, curved ribs, continuous sinusoidal ribs, discontinuous sinusoidal ribs, S-shaped ribs, continuous zig-zag-sawtooth-like ribs, broken discontinuous zig-zag-sawtooth-like ribs, grooves, channels, textured areas, embossments, dimples, columns, mini columns, porous, non-porous, cross ribs, mini ribs, cross-mini ribs, and combinations thereof.

5. The battery separator of claim 1 wherein said positive ribs are broken ribs being defined by an angular orientation to enhance acid mixing in a battery, especially during movement of said battery, with said separator disposed therein and positioned parallel to a start and stop motion of said battery.

6. The battery separator of claim 5 wherein said angular orientation is relative to a machine direction of said porous membrane and said angular orientation is an angle chosen from the group consisting of between greater than zero degrees(0°) and less than 180 degrees (180°), and greater than 180 degrees(180°) and less than 360 degrees (360°).

7. The battery separator of claim 5 wherein said positive ribs comprise one or more subsets of ribs; a first subset of ribs within said one or more subsets of ribs comprise a first angular orientation; and at least a second subset of ribs within said one or more subsets of ribs comprise a second angular orientation.

8. The battery separator of claim 1 wherein said positive ribs are disposed at an angular orientation relative to a machine direction of said porous membrane that is between zero degrees(0°) to 360 degrees (360°).

9. The battery separator of claim 1 wherein said positive ribs have a height of approximately 50 µm to approximately 2.0 mm.

10. The battery separator of claim 1 wherein said positive ribs have a base width of approximately 300 µm to approximately 750 µm.

11. The battery separator of claim 10 wherein of said positive ribs have a second base width of approximately 400 µm to approximately 500 µm.

12. The battery separator of claim 1 wherein said negative ribs have a top portion with a semi-circular or triangular shape.

13. The battery separator of claim 1 wherein said negative ribs extend uniformly from a first lateral side edge to a second lateral side edge of said porous membrane.

14. The battery separator of claim 1 wherein said negative ribs are one of the following group consisting of solid ribs, discrete broken ribs, continuous ribs, discontinuous ribs, discontinuous peaks, discontinuous protrusions, angled ribs, diagonal ribs, linear ribs, ribs that are longitudinally extending substantially in a machine direction of said porous membrane, ribs that are laterally extending substantially in a cross-machine direction of said porous membrane, ribs that are transversely extending substantially in said cross-machine direction of the separator, discrete teeth, toothed ribs, serrations, serrated ribs, battlements, battlemented ribs, curved ribs, continuous sinusoidal ribs, discontinuous sinusoidal ribs, S-shaped ribs, continuous zig-zag-sawtooth-like ribs, broken discontinuous zig-zag-sawtooth-like ribs, grooves, channels, textured areas, embossments, dimples, columns, mini columns, porous, non-porous, cross ribs, mini ribs, cross-mini ribs, and combinations thereof.

15. The battery separator of claim 1 wherein said negative ribs are broken ribs being defined by an angular orientation to enhance acid mixing in a battery, especially during movement of said battery, with said separator disposed therein and positioned parallel to a start and stop motion of said battery.

16. The battery separator of claim 15 wherein said angular orientation is relative to a machine direction of said porous membrane and said angular orientation is an angle chosen from the group consisting of between greater than zero degrees(0°) and less than 180 degrees (180°), and greater than 180 degrees(180°) and less than 360 degrees (360°).

17. The battery separator of claim 15 wherein said negative ribs comprise one or more subsets of ribs; a first subset of ribs within said one or more subsets of ribs comprise a first angular orientation; and at least a second subset of ribs within said one or more subsets of ribs comprise a second angular orientation.

18. The battery separator of claim 1 wherein said negative ribs are disposed at an angular orientation relative to a machine direction of said porous membrane that is between zero degrees(0°) to 360 degrees (360°).

19. The battery separator of claim 1 wherein said plurality of ribs comprise said negative ribs and a set of positive ribs, wherein the height of the negative ribs are approximately 5.0% to approximately 100% compared to the height of said set of positive ribs.

20. The battery separator of claim 1 wherein said negative ribs have a height of approximately 5.0 µm to approximately 2.0 mm.

21. The battery separator of claim 1 wherein said negative ribs have a base width of approximately 5 µm to approximately 500 µm.

22. The battery separator of claim 1 wherein said polymer comprises one of the following group consisting of a polymer, polyolefin, polyethylene, polypropylene, ultra-high molecular weight polyethylene ("UHMWPE"), phenolic resin, polyvinyl chloride ("PVC"), rubber, synthetic wood pulp ("SWP"), lignins, glass fibers, synthetic fibers, cellulosic fibers, and combinations thereof.

23. The battery separator of claim 22 wherein said rubber comprises one of the following group consisting of cross-linked rubber, un-cross-linked rubber, cured rubber, uncured rubber, natural rubber, latex, synthetic rubber, and combinations thereof.

24. The battery separator of claim 22 wherein said rubber comprises one of the following group consisting of methyl rubber, polybutadiene, one or more chloropene rubbers, butyl rubber, bromobutyl rubber, polyurethane rubber, epichlorhydrin rubber, polysulphide rubber, chlorosulphonyl polyethylene, polynorbornene rubber, acrylate rubber, fluorine rubber, silicone rubber, copolymer rubbers, and combinations thereof.

25. The battery separator of claim 24 wherein said copolymer rubbers comprise one of the following group consisting of styrene/butadiene rubbers, acrylonitrile/butadiene rubbers, ethylene/propylene rubbers (EPM and EPDM), ethylene/vinyl acetate rubbers, and combinations thereof.

26. The battery separator of claim 22 wherein said rubber is present at an amount that is approximately 1% by weight to approximately 6% by weight.

27. The battery separator of claim 22 wherein said rubber is present at an amount that is approximately 3% by weight to approximately 6% by weight.

28. The battery separator of claim 22 wherein said rubber is present at an amount that is approximately 3% by weight.

29. The battery separator of claim 22 wherein said rubber is present at an amount that is approximately 6% by weight.

30. The battery separator of claim 22 wherein said rubber is coated on at least one side of said porous membrane.

31. The battery separator of claim 1 wherein said filler further comprises one of the following group consisting of alumina; talc; fish meal, fish bone meal, and combinations thereof.

32. The battery separator of claim 31 wherein a molecular ratio of OH:Si groups within said filler, measured by 29Si-NMR, is within a range of approximately 21:100 to 35:100.

33. The battery separator of claim 31 wherein a molecular ratio of OH:Si groups within said filler, measured by 29Si-NMR, is at least approximately 27:100 or greater.

34. A battery separator comprising:
a porous membrane comprising: a polymer; and a filler; said porous membrane having a backweb having a negative electrode facing surface and a positive electrode facing surface with a plurality of ribs extending from either or both of the negative electrode facing surface and the positive electrode facing surface;
an acid leachable total organic carbon ("TOC") of less than or equal to approximately 2,000 mg per kg of said battery separator as measured by a potassium persulfate solution react with carbon in an ultra-violet detection chamber, and wherein the plurality of ribs have a top portion with a semi-circular or triangular shape;

wherein said filler further comprises one of the following group consisting of alumina; talc; fish meal, fish bone meal, and combinations thereof; and wherein a molecular ratio of OH:Si groups within said filler, measured by 29Si-NMR, is within a range of approximately 21:100 to 35:100;

wherein the filler is a friable silica having a bi-modal or tri-modal particle size distribution;

wherein said plurality of ribs comprises positive ribs and negative ribs, wherein said positive ribs extend from a positive electrode facing surface of said porous membrane;

and wherein said negative ribs extend from a negative electrode facing surface of said porous membrane;

wherein said negative ribs are optimized to mitigate dendrite shorts; and wherein said positive ribs are optimized to mitigate dendrite shorts.

35. The battery separator of claim 34 wherein a molecular ratio of OH:Si groups within said filler, measured by 29Si-NMR, is at least approximately 27:100 or greater.

* * * * *